US009351143B2

(12) United States Patent
Barany et al.

(10) Patent No.: US 9,351,143 B2
(45) Date of Patent: May 24, 2016

(54) MULTI-HOMED PEER-TO-PEER NETWORK

(75) Inventors: Peter Anthony Barany, San Diego, CA (US); Julien H. Laganier, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 396 days.

(21) Appl. No.: 13/149,474

(22) Filed: May 31, 2011

(65) Prior Publication Data

US 2011/0294474 A1 Dec. 1, 2011

Related U.S. Application Data

(60) Provisional application No. 61/350,433, filed on Jun. 1, 2010.

(51) Int. Cl.
*H04B 7/00* (2006.01)
*H04W 8/00* (2009.01)
*H04W 76/02* (2009.01)
*H04W 88/06* (2009.01)

(52) U.S. Cl.
CPC ............ *H04W 8/005* (2013.01); *H04W 76/023* (2013.01); *H04W 88/06* (2013.01)

(58) Field of Classification Search
CPC ........................................................ H04B 7/00
USPC ........................................................ 455/518
See application file for complete search history.

(56) References Cited

U.S. PATENT DOCUMENTS

| 6,542,750 B2* | 4/2003 | Hendrey et al. ............ 455/456.1 |
| 2008/0318612 A1* | 12/2008 | Axnas et al. .................. 455/522 |
| 2009/0129301 A1* | 5/2009 | Belimpasakis ............... 370/310 |

(Continued)

FOREIGN PATENT DOCUMENTS

| CN | 101305632 A | 11/2008 |
| EP | 1289329 A1 | 3/2003 |

(Continued)

OTHER PUBLICATIONS

Inayat R., et al., "A seamless handoff for dual-interfaced mobile devices in hybrid wireless access networks" Advanced Information Networking and Applications, 2004. AINA 2004. 18TH International Conference on Fukuoka, Japan Mar. 29-31, 2004, Piscataway, NJ, USA, IEEE, vol. 1, Mar. 29, 2004, pp. 373-378, XP010695446.

(Continued)

*Primary Examiner* — Huy C Ho
(74) *Attorney, Agent, or Firm* — François A. Pelaez

(57) ABSTRACT

Techniques are provided for efficient peer-to-peer (P2P) service discovery and group formation, as well as maintenance of P2P session continuity. In one example, there is provided a method, operable by an originating user equipment (UE), that may involve transmitting a request for P2P service discovery and group formation assistance to a discovery server via a serving node over an air-interface channel. The method may involve receiving scoped information from the discovery server for participating in a P2P communication session, and establishing the P2P communication session with at least one terminating UE based at least in part on the received scoped information. The method may involve maintaining P2P communication session continuity by reverting to bearer signaling via a packet core.

77 Claims, 28 Drawing Sheets

(56) References Cited

U.S. PATENT DOCUMENTS

2009/0285119 A1 11/2009 Horn et al.
2010/0061294 A1* 3/2010 Proctor et al. ................ 370/328

FOREIGN PATENT DOCUMENTS

| | | |
|---|---|---|
| JP | 2006523404 A | 10/2006 |
| JP | 2007503788 A | 2/2007 |
| JP | 3926746 B2 | 6/2007 |
| JP | 2009017101 A | 1/2009 |
| WO | 02082852 A1 | 10/2002 |
| WO | 2004080103 A1 | 9/2004 |
| WO | 2004103008 A1 | 11/2004 |
| WO | 2009142629 A2 | 11/2009 |

OTHER PUBLICATIONS

International Search Report and Written Opinion—PCT/US2011/038799, ISA/EPO—Sep. 22, 2011.

* cited by examiner

2100

| Octets | Bits | | | | | | | |
|---|---|---|---|---|---|---|---|---|
| | 8 | 7 | 6 | 5 | 4 | 3 | 2 | 1 |
| 1 | Version | | | PT | (*) | E | S | PN |
| 2 | Message Type | | | | | | | |
| 3 | Length (1st Octet) | | | | | | | |
| 4 | Length (2nd Octet) | | | | | | | |
| 5 | Tunnel Endpoint Identifier (1st Octet) | | | | | | | |
| 6 | Tunnel Endpoint Identifier (2nd Octet) | | | | | | | |
| 7 | Tunnel Endpoint Identifier (3rd Octet) | | | | | | | |
| 8 | Tunnel Endpoint Identifier (4th Octet) | | | | | | | |
| 9 | Sequence Number (1st Octet) | | | | | | | |
| 10 | Sequence Number (2nd Octet) | | | | | | | |
| 11 | N-PDU Number | | | | | | | |
| 12 | Next Extension Header Type | | | | | | | |

| Octets | Bits | | | | | | | |
|---|---|---|---|---|---|---|---|---|
| | 8 | 7 | 6 | 5 | 4 | 3 | 2 | 1 |
| 1 | Extension Header Length = 0000 0001 (4 octets units) | | | | | | | |
| 2 | PDCP PDU number | | | | | | | |
| 3 | PDCP PDU number | | | | | | | |
| 4 | Next Extension Header Type = 0000 0000 | | | | | | | |

*FIG. 22*

MULTI-HOMED PEER-TO-PEER NETWORK

CLAIM OF PRIORITY UNDER 35 U.S.C. §119

The present application for patent claims priority to Provisional Application No. 61/350,433 filed Jun. 1, 2010, entitled "MULTI-HOMED PEER-TO-PEER NETWORK", which is hereby expressly incorporated in its entirety by reference herein.

BACKGROUND

1. Field

The present disclosure relates to a mobile operating environment, and more particularly, to a packet data network gateway facilitating service discovery, group formation and session continuity for peer-to-peer (P2P) networking.

2. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of mobile entities, such as, for example, user equipments (UEs). A UE may communicate with a base station via the downlink and uplink. The downlink (or forward link) refers to the communication link from the base station to the UE, and the uplink (or reverse link) refers to the communication link from the UE to the base station. Such communication links may be established via a single-in-single-out, multiple-in-signal-out, or a multiple-in-multiple-out (MIMO) system.

Dual mode (or multi-mode) mobiles refer to UEs that are compatible with more than one form of data transmission or network, as contrasted with single-mode mobiles. For instance, a multi-mode UE may use more than one technique for sending and receiving voice and data. Multi-mode can refer to network compatibility, such as UEs containing two types of cellular radios for voice and data. In another aspect, a dual mode UE can use both cellular and non-cellular radios for voice and data communication. For example, a given dual mode UE may use cellular radio that contain GSM/CDMA/W-CDMA, as well as another technology like IEEE 802.11 (Wi-Fi) radio, WiMAX, or Digital Enhanced Cordless Telecommunications (DECT) radio. In related aspects, Wi-Fi is a subset of wireless local area network (WLAN) that links devices via a wireless distribution method (typically spread-spectrum or OFDM) and usually provides a connection through an access point to the wider Internet. This gives users the mobility to move around within a local coverage area and still be connected to the network. In further related aspects, WiMAX, an acronym for Worldwide Interoperability for Microwave Access, provides fixed and fully mobile Internet access, and is based on the IEEE 802.16 standard.

Some multi-mode UEs can communicate peer-to-peer (P2P) which refers to a distributed network architecture composed of participants that make up a portion of their resources (such as processing power, disk storage or network bandwidth) directly available to other network participants, without the need for central coordination instances (such as servers or stable hosts).

While wireless P2P networking has a number of advantages, it can be difficult for service discovery to determine what devices are within range. If the service discovery is "unscoped" in the sense that the number of availability broadcasts or responses by the P2P UEs is not limited to devices that are likely to be within radio frequency (RF) range of each other, this can impose a significant burden on devices to broadcast their availability and to negotiate a connection. This can be especially troublesome in congested area with many devices that can consume available air link resources. Also, the number of responses to an unscoped service discovery may be excessive and irrelevant (e.g., the devices may be unlikely to be within RF range). In this context, there is a need for P2P UEs to efficiently discover available P2P services and to form groups. There is also a need for UEs within a group to maintain P2P session continuity even when the P2P communication link(s) between group members become weak or broken.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects of the embodiments described herein, a method is provided for peer-to-peer (P2P) networking facilitated by a wireless wide area network, wherein the method may be performed by an originating user equipment (UE). Users register their services (e.g., P2P applications) and group formation information with a discovery server. A first user equipment may transmit a request for P2P service discovery and group formation assistance to a serving node (e.g., a discovery server) over an air-interface channel. The user may be configured with the Internet Protocol (IP) address or Domain Name System (DNS) resolvable Fully Qualified Domain Name (FQDN) of the discovery server out-of-band. Service and group formation information may be received as part of a scoped service discovery ("scoped" in the sense that the number of responses is limited to devices that are likely to be within radio frequency (RF) range). A P2P communication session may be established with a second UE that responded to respective information as part of the group formation procedure. One or more members of the group may maintain P2P communication session continuity by reverting to bearer signaling via the packet core if they are no longer in RF range (or if they were not within RF range initially and still joined the group via the packet core). In related aspects, an electronic device (e.g., an originating UE or component(s) thereof) may be configured to execute the above described methodology.

In accordance with one or more aspects of the embodiments described herein, a method is provided for P2P networking facilitated by a wireless wide area network, wherein the method may be performed by a network entity (e.g., an eNB). A request may be received from a first UE for P2P service discovery and group formation assistance via a serving node over an air-interface channel. A scoped subset may be determined of a plurality of UEs that is appropriate for P2P service discovery. Information may be transmitted to the scoped subset of the plurality of UEs for participating in RF proximity discovery (i.e., to determine if the UEs of the scoped subset are within RF range). In related aspects, an electronic device (e.g., a network entity or component(s) thereof) may be configured to execute the above described methodology.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 21 illustrates a diagram of a data structure for a 3GPP Release 8 General Packet Radio System (GPRS) Tunneling Protocol User Plane (GTPv1-U) for header format.

FIG. 22 illustrates a diagram of a data structure for a PDCP Packet Data Unit (PDU) Number Extension Header.

DETAILED DESCRIPTION

Techniques for supporting peer-to-peer (P2P) communication are described herein. The techniques may be used for various wireless communication networks such as wireless wide area networks (WWANs) and wireless local area networks (WLANs). The terms "network" and "system" are often used interchangeably. The WWANs may be CDMA, TDMA, FDMA, OFDMA, SC-FDMA and/or other networks. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). A WLAN may implement a radio technology such as IEEE 802.11 (Wi-Fi), Hiperlan, etc.

The techniques described herein may be used for the wireless networks and radio technologies mentioned above as well as other wireless networks and radio technologies. For clarity, certain aspects of the techniques are described below for 3GPP network and WLAN, and LTE and WLAN terminology is used in much of the description below. The word "exemplary" is used herein to mean "serving as an example, instance, or illustration." Any embodiment described herein as "exemplary" is not necessarily to be construed as preferred or advantageous over other embodiments.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1A:
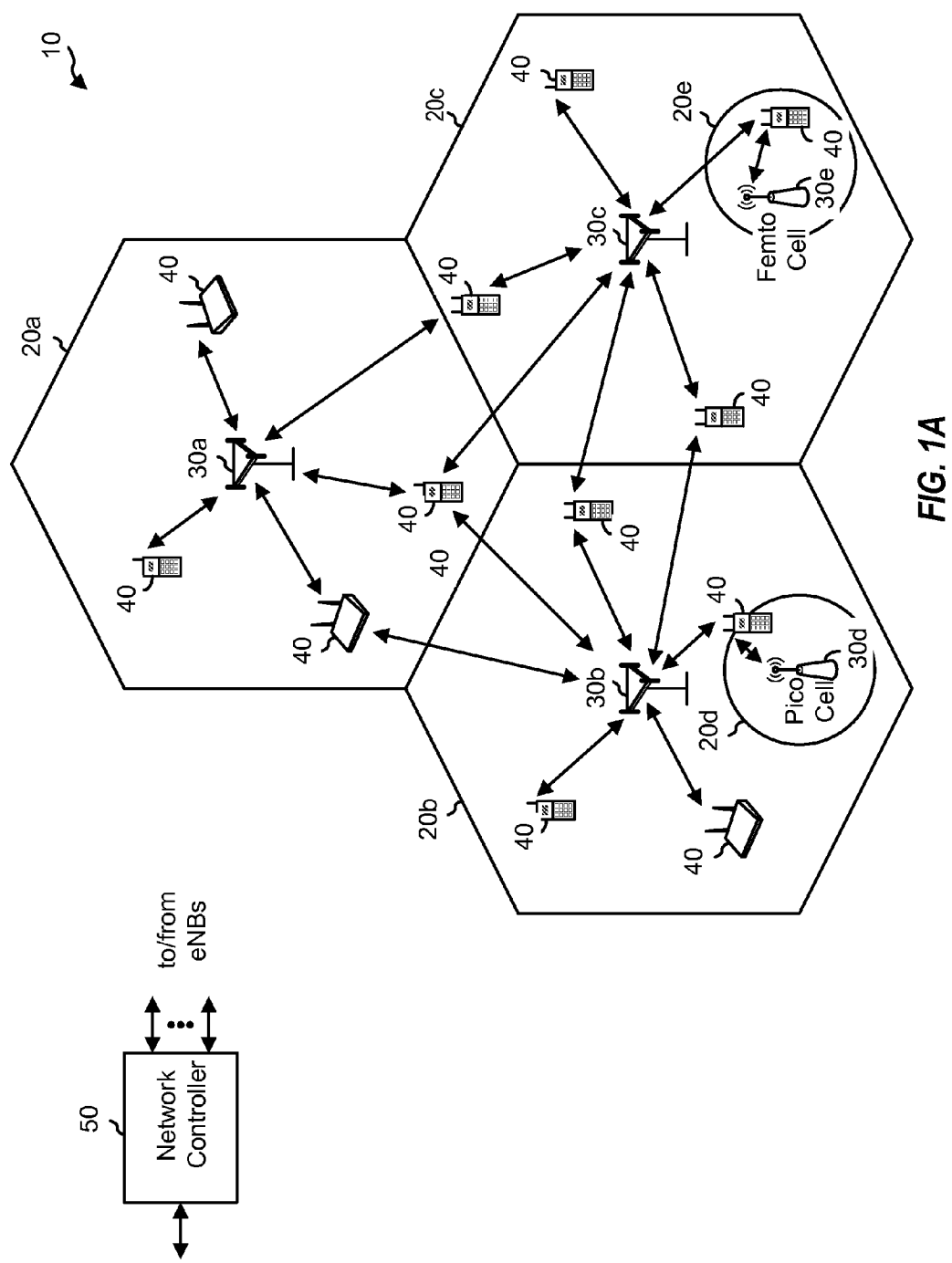
FIG. 1A shows a wireless communication network.

FIG. 1A shows a wireless communication network 10, which may be an LTE network or some other wireless network. Wireless network 10 may include a number of evolved Node Bs (eNBs) 30 and other network entities. An eNB may be an entity that communicates with mobile entities (e.g., user equipment (UE)) and may also be referred to as a base station, a Node B, an access point, etc. Although the eNB typically has more functionalities than a base station, the terms "eNB" and "base station" are used interchangeably herein. Each eNB 30 may provide communication coverage for a particular geographic area and may support communication for mobile entities (e.g., UEs) located within the coverage area. To improve network capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). In the example shown in FIG. 1A, eNBs 30a, 30b, and 30c may be macro eNBs for macro cell groups 20a, 20b, and 20c, respectively. Each of the cell groups 20a, 20b, and 20c may include a plurality (e.g., three) of cells or sectors. An eNB 30d may be a pico eNB for a pico cell 20d. An eNB 30e may be a femto eNB or femto access point (FAP) for a femto cell 20e.

Wireless network 10 may also include relays (not shown in FIG. 1A). A relay may be an entity that can receive a transmission of data from an upstream station (e.g., an eNB or a UE) and send a transmission of the data to a downstream station (e.g., a UE or an eNB). A relay may also be a UE that can relay transmissions for other UEs.

A network controller 50 may couple to a set of eNBs and may provide coordination and control for these eNBs. Network controller 50 may comprise a single network entity or a collection of network entities. Network controller 50 may communicate with the eNBs via a backhaul. The eNBs may also communicate with one another, e.g., directly or indirectly via a wireless or wired backhaul.

UEs 40 may be dispersed throughout wireless network 10, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc. A UE may be able to communicate with eNBs, relays, etc. A UE may also be able to communicate peer-to-peer (P2P) with other UEs.

Wireless network 10 may support operation on a single carrier or multiple carriers for each of the downlink and uplink. A carrier may refer to a range of frequencies used for communication and may be associated with certain characteristics. Operation on multiple carriers may also be referred to as multi-carrier operation or carrier aggregation. A UE may operate on one or more carriers for the downlink (or downlink carriers) and one or more carriers for the uplink (or uplink carriers) for communication with an eNB. The eNB may send data and control information on one or more downlink carriers to the UE. The UE may send data and control information on one or more uplink carriers to the eNB. In one design, the downlink carriers may be paired with the uplink carriers. In this design, control information to support data transmission on a given downlink carrier may be sent on that downlink carrier and an associated uplink carrier. Similarly, control information to support data transmission on a given uplink carrier may be sent on that uplink carrier and an associated downlink carrier. In another design, cross-carrier control may be supported. In this design, control information to support data transmission on a given downlink carrier may be sent on another downlink carrier (e.g., a base carrier) instead of the downlink carrier.

Wireless network 10 may support carrier extension for a given carrier. For carrier extension, different system bandwidths may be supported for different UEs on a carrier. For example, the wireless network may support (i) a first system bandwidth on a downlink carrier for first UEs (e.g., UEs supporting LTE Release 8 or 9 or some other release) and (ii) a second system bandwidth on the downlink carrier for second UEs (e.g., UEs supporting a later LTE release). The second system bandwidth may completely or partially overlap the first system bandwidth. For example, the second system bandwidth may include the first system bandwidth and additional bandwidth at one or both ends of the first system bandwidth. The additional system bandwidth may be used to send data and possibly control information to the second UEs.

Wireless network 10 may support data transmission via single-input single-output (SISO), single-input multiple-output (SIMO), multiple-input single-output (MISO), and/or multiple-input multiple-output (MIMO). For MIMO, a transmitter (e.g., an eNB) may transmit data from multiple transmit antennas to multiple receive antennas at a receiver (e.g., a UE). MIMO may be used to improve reliability (e.g., by transmitting the same data from different antennas) and/or to improve throughput (e.g., by transmitting different data from different antennas).

Wireless network 10 may support single-user (SU) MIMO, multi-user (MU) MIMO, Coordinated Multi-Point (CoMP), etc. For SU-MIMO, a cell may transmit multiple data streams to a single UE on a given time-frequency resource with or without precoding. For MU-MIMO, a cell may transmit multiple data streams to multiple UEs (e.g., one data stream to each UE) on the same time-frequency resource with or without precoding. CoMP may include cooperative transmission and/or joint processing. For cooperative transmission, multiple cells may transmit one or more data streams to a single UE on a given time-frequency resource such that the data transmission is steered toward the intended UE and/or away from one or more interfered UEs. For joint processing, multiple cells may transmit multiple data streams to multiple UEs (e.g., one data stream to each UE) on the same time-frequency resource with or without precoding.

Wireless network 10 may support hybrid automatic retransmission (HARQ) in order to improve reliability of data transmission. For HARQ, a transmitter (e.g., an eNB) may send a transmission of a data packet (or transport block) and may send one or more additional transmissions, if needed, until the packet is decoded correctly by a receiver (e.g., a UE), or the maximum number of transmissions has been sent, or some other termination condition is encountered. The transmitter may thus send a variable number of transmissions of the packet.

Wireless network 10 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

Wireless network 10 may utilize frequency division duplex (FDD) or time division duplex (TDD). For FDD, the downlink and uplink may be allocated separate frequency channels, and downlink transmissions and uplink transmissions may be sent concurrently on the two frequency channels. For TDD, the downlink and uplink may share the same frequency channel, and downlink and uplink transmissions may be sent on the same frequency channel in different time periods. In related aspects, the FAP synchronization algorithm described in further detail below may be applied to the FAPs using FDD or TDD duplexing.

In accordance with one or more aspects of the embodiments described herein, there is provided a technique for using application layer and/or upper layer protocols to address how an originating UE registers scoped services and discovers scoped services, wherein the scope may reference to location (e.g., of a base station or of the UE), such that the discovered results are for other terminating UEs within the originating UE's scope (i.e., that are likely to be within RF range). The service discovery query may be for specific P2P applications and group formation information. Also described herein is a technique relating to how an originating UE forms or joins a group, or P2P direct communication links with one or more terminating UEs (i.e., the group formation procedure). Also described herein is a technique relating to how session continuity is maintained between a UE and one or more UEs in a P2P group if the UE moves and the P2P direct communication link is broken (i.e., one or more UEs are no longer within RF range).

It is noted that conventional service discovery mechanisms include Service Location Protocol, version 2 (SLPv2), Zeroconfig, Universal Plug and Play (UPnP), Web Services Dynamic Discovery (WS-Discovery), Universal Description, Discovery and Integration (UDDI), Representational State Transfer (REST)-based solution using Web services registry, Bluetooth, Session Initiation Protocol (SIP) presence service, Zigbee that is a specification for a suite of high level communication protocols using small, low-power digital radios based on the IEEE 802.15.4 standard, etc. However, the majority of these existing service discovery mechanisms are deficient for LTE P2P service discovery requirements, with the exception of a REST-based solution. The advantage of the REST-based solution is that it can also be used for P2P group formation and maintenance signaling between P2P peers.

With respect to Extensible Markup Language (XML)-based solutions, options include SOAP over Hypertext Transfer Protocol (HTTP), as well as REST. In certain applications, REST may be preferred over SOAP because it makes proper use of HTTP methods.

To address these and other related issues, the techniques described herein may involve using Web services (i.e., REST which comprises HTTP, URI and XML schema/document) to implement a scoped service discovery Web server which mobile stations can access via an application on the mobile station OS (i.e., a service discovery application). In related aspects, to address group formation, the techniques described herein may involve using Web services to exchange Internet Protocol (IP) packets between an originating UE and terminating UE(s) to trigger the terminating UE(s) to transmit a pilot signal or beacon and optionally report RF signal strength measurement to the originating UE (alternatively, the originating UE may propose to transmit its pilot signal or beacon instead). This makes it possible for the originating UE to determine if the terminating UE are within RF proximity of each other.

In further related aspects, to address the maintenance session continuity, the techniques described herein may involve using Dual Stack Mobile IPv6 (DSMIPv6) or Shim6 to allow a UE to switch between a direct P2P communication link and a communication link to a base station if conditions warrant, while maintaining transparency to the P2P application. In yet further related aspects, the techniques described herein can work for any Radio Access Technology (RAT) for both the direct P2P communication link and for the link to the base station because the techniques are primarily based upon by application layer/upper layer protocols. This allows the use of the licensed spectrum, while at the same time making it possible for inter-operator mobile station P2P groups to be established. The techniques described herein are an improvement over conventional approaches, wherein the challenges for service discovery may be addressed at the Physical (PHY) layer, which may limit extensibility/flexibility and RAT transparency. The techniques described herein are an improvement over other conventional approaches, which may involve addressing the group formation problem by using RAT specific control signaling instead of Web services/IP layer.

Figure 1B:
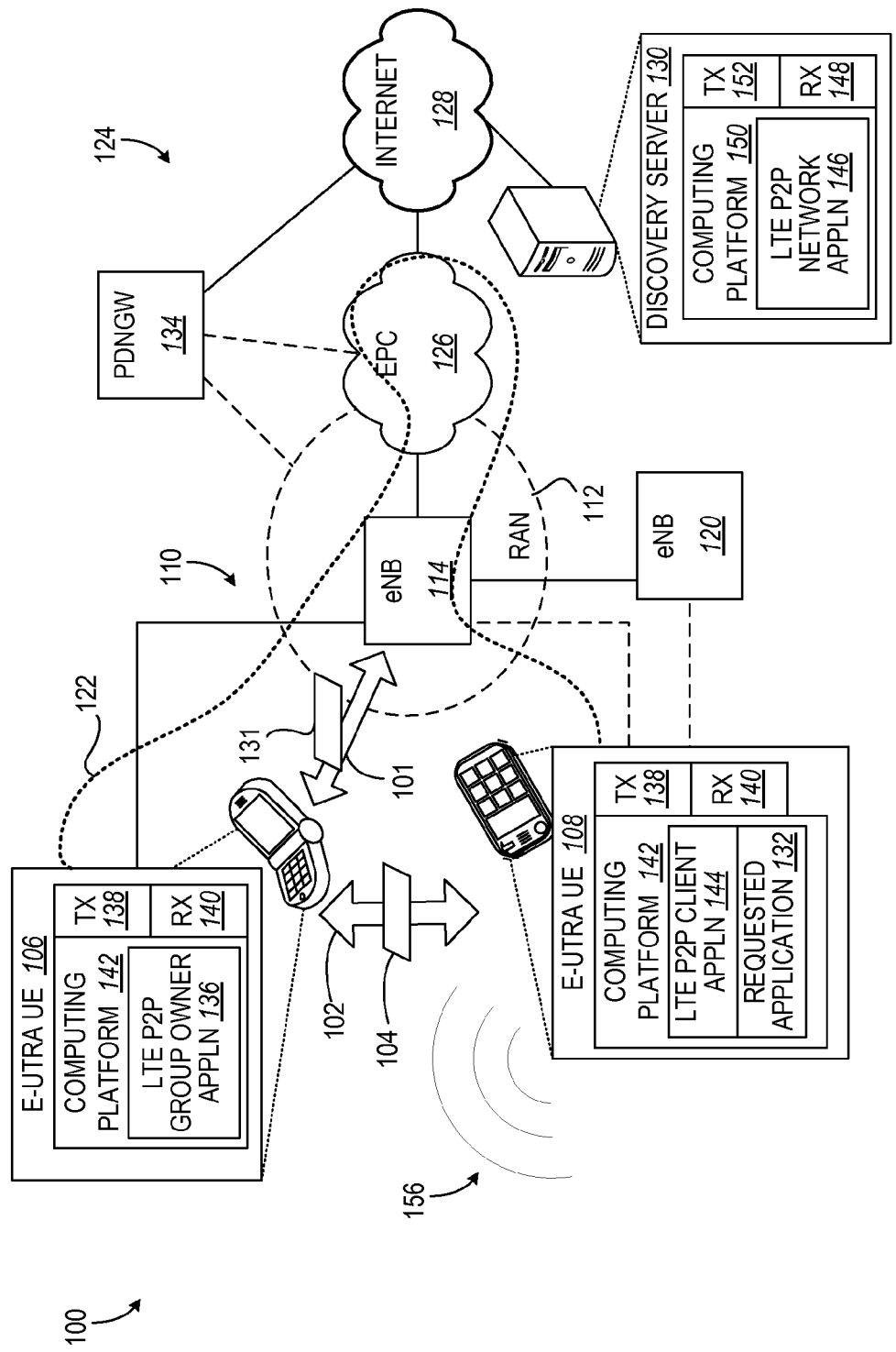
FIG. 1B illustrates a schematic diagram of a wireless peer-to-peer (P2P) system having an upper layers implementation that enhances service discovery, group formation and session continuity.

With reference to FIG. 1B, there is shown a wireless P2P system 100 which implements an upper layer technique for enhancing service discovery, group formation, and session continuity for a P2P air-interface channel 101 or a direct communications link 102 that carries signaling and bearer data 104 between originating and terminating UE 106 and 108, respectively. To facilitate this communication by scoping the discovery, the originating UE 106 and the terminating UE 108 may also communicate across a WWAN 110 by communicating with a Radio Access Network (RAN) 112, specifically an eNB 114, via an already-established Evolved Packet System (EPS) bearer. In some instances, the terminating UE 108 may be serviced by another eNB 120. If both the originating and terminating UEs 106, 108 are serviced by the same eNB 114, the establishment of a P2P type-1 EPS bearer 122 across an LTE network architecture 124 may be made via an Evolved Packet Core (EPC) 126. Additional packet data may be exchanged with the Internet 128 via the EPC 126 or the like.

The originating UE 106 may contact a discovery server 130 that is in communication with the Internet 128 to obtain service discovery and group formation information 131. The originating UE 106 may then contacts the terminating UE 108 that supports a requested P2P application 132 to perform a group formation procedure.

The originating UE 106 may choose a specific packet data network (PDN) gateway (GW) (PDNGW) 134 for the establishment of the P2P type-1 EPS bearer based upon the results of the service discovery procedure. For example, the originating UE 106 may find that the terminating UE 108 is in the same cell or is serviced by the same eNB 114 as the originating UE 106. Thus, the PDNGW 134 can be co-located with the eNB 114. Consequently, the original EPS bearers that were used for service discovery, etc. are not used as P2P type-1 EPS bearers. In order to off-load traffic from the core network, a P2P type-1 EPS bearer can be established with a PDNGW co-located with the eNB 114 for both UEs in the event that the UEs 106, 108 are not within RF proximity of each other (e.g., see EPS network architecture 300 of FIG. 3). Note that even if the originating UE 106 and the terminating UE 108 are in different cells belonging to different eNBs, the PDNGW 134 co-located with the eNB 114 can still be used for the P2P type-1 EPS bearer establishment for both UEs if there is a connection between eNB 114 and eNB 120 (e.g., if an X2 interface exists between the eNBs 114, 120).

In another example, the terminating UE 108 may be in another cell that is serviced by a different eNB 120 and there may be no connection (i.e., X2 interface) between eNB 114 and eNB 120; thus, the PGNGW 134 can be located in the EPC 126 outside of the eNB 120 (in which case there is no need to establish a P2P type-1 EPS bearer, or to view it another way, the original EPS bearer that was used for service discovery, etc. may be the P2P type-1 EPS bearer). An already-established EPS bearer may be used in the event that the UEs 106, 108 are not within RF proximity of each other. The P2P direct communications link 102, via the P2P type-2 EPS bearer 104, may then be established with little interaction with the RAN or core network. In the event of a disruption in the P2P direct communications link (i.e., the UEs 106, 108 are not within RF proximity of each other and the P2P type-2 EPS bearer 104 cannot be used), the P2P type-1 EPS bearer 122 or already-established EPS bearers across the LTE network architecture 124 may be used, thereby providing session continuity.

In related aspects, a given apparatus, such as the originating UE 106, may be provided with an LTE P2P group owner application 136 for P2P networking, facilitated by a WWAN. The UE 106 may include a transmitter 138 for transmitting a request for P2P service discovery and group formation assistance to the discovery server 130 via the serving node 114 over the air-interface channel 101 (e.g., using an already-established EPS bearer). The UE 106 include have a receiver 140 for receiving scoped information from the discovery server 130 for participating in a P2P communication session. The UE 106 may include a computing platform 142 for establishing, via its transmitter 138 and receiver 140, the P2P communication session with the terminating UE 108 that uses an LTE P2P client application 144 or the like. Again, this may done using already-established EPS bearer(s).

In further related aspects, a given apparatus, such as the discovery server 130, may be provided with an LTE P2P network application 146 for P2P networking facilitated by a wireless wide area network. The server 130 may include a receiver 148 that receives, from the originating UE 106, a request for P2P service discovery and group formation assistance, via the serving node 114, over the air-interface channel 101. The server 130 may include a computing platform 150 that determines a scoped subset of a plurality of UEs that is/are appropriate for P2P service discovery, wherein the UEs have previously registered their scoped services and group formation information with the server 130 or another discovery server in operative communication with the server 130. The server 130 may include a transmitter 152 transmits the information 131 of the scoped subset of the plurality of UEs to the originating UE 106. The discovery server 130 can also transmit such information to an LTE P2P client application 154 of the terminating UE 108, such as to prompt transmission of a pilot signal or beacon 156 by the UE 108. The discovery server 130 is also capable of receiving scope service registrations from UEs.

In view of exemplary systems shown and described herein, methodologies that may be implemented in accordance with the disclosed subject matter, will be better appreciated with reference to various flow charts. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 2A:
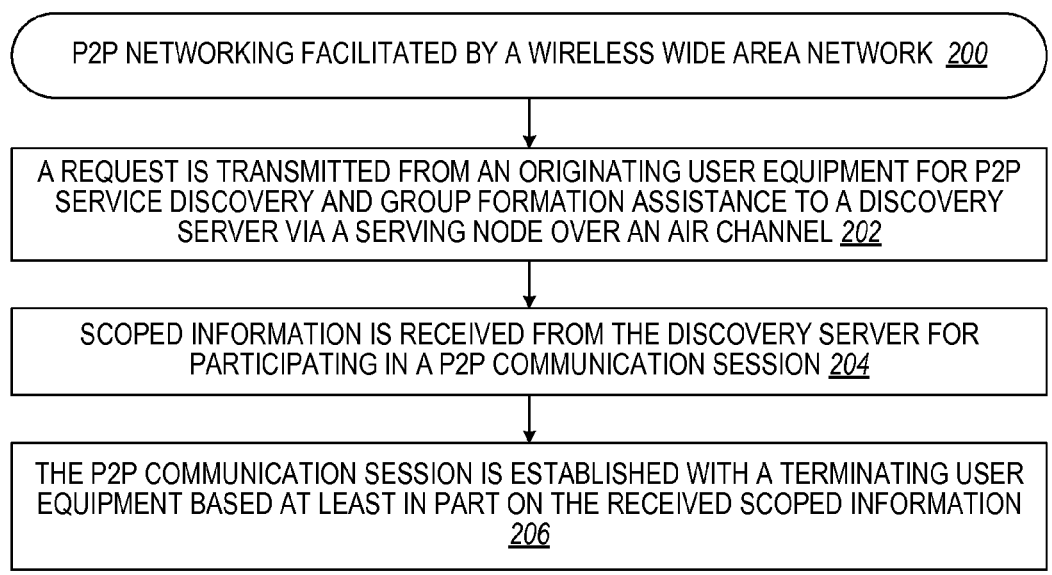
FIG. 2A illustrates an example P2P networking methodology executable by an originating user equipment (UE).

With reference to FIG. 2A, there is shown a methodology 200 for P2P networking, operable by an originating UE or the like, that may be facilitated by a WWAN. An originating UE may transmit a request for P2P service discovery and group formation assistance to a discovery server via a serving node over an air-interface channel (block 202). Previously, UEs may register their scoped services with the discovery server to facilitate later discovery. The user may be configured with the IP address or Domain Name System (DNS) resolvable Fully Qualified Domain Name (FQDN) of the discovery server out-of-band. In response to the transmitted request, scoped information may be received from the discovery server for participating in a P2P communication session (block 204). The P2P communication session may be established with at least one terminating UE (e.g., based at least in part on the received scoped information) (block 206).

Figure 2B:
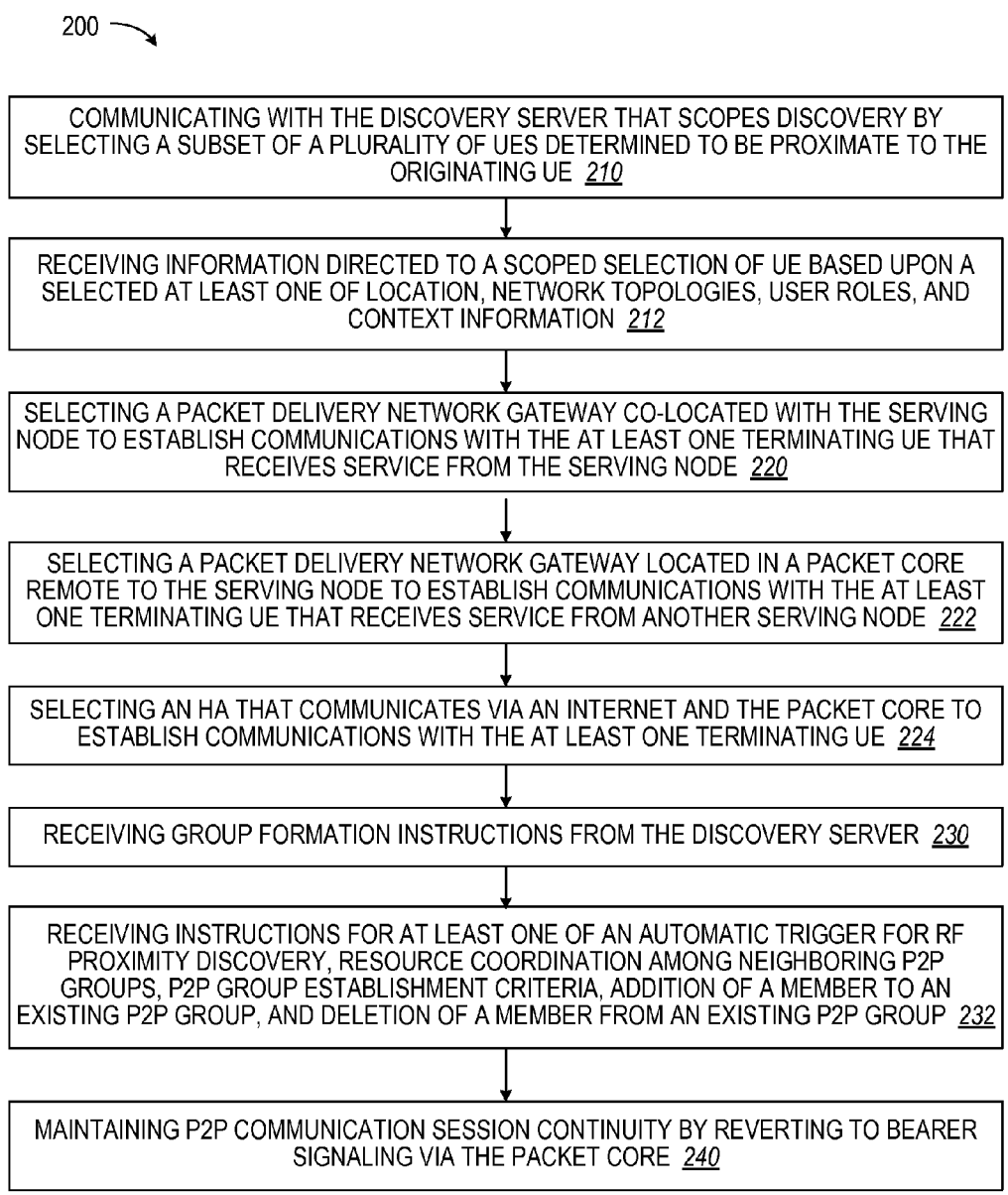
FIG. 2B illustrates further aspects of the methodology of FIG. 2A.

With reference to FIG. 2B, there are shown further operations or aspects of the method 200 that are optional and may be performed by an originating UE or the like for P2P networking. If the method 200 includes at least one block of FIG. 2B, then the method 200 may terminate after the at least one block, without necessarily having to include any subsequent downstream block(s) that may be illustrated. It is further noted that numbers of the blocks do not imply a particular order in which the blocks may be performed according to the method 200. For example, transmitting (block 202) may involve communicating with the discovery server that scopes discovery by selecting a subset of a plurality of UEs determined to be proximate to the originating UE (block 210). Receiving (block 204) may involve receiving information directed to a scoped selection of UE based upon a selected at least one of location, network topologies, user roles, and context information (block 212).

In related aspects, the method 200 may further involve selecting a packet delivery network gateway co-located with the serving node to establish communications with the at least one terminating UE that receives service from the serving node (block 220). In the alternative, the method 200 may further involve selecting a packet delivery network gateway located in a packet core remote to the serving node to establish communications with the at least one terminating UE that receives service from another serving node (block 222), and selecting a home agent (HA) (if DSMIPv6 is used for session continuity) that communicates via an Internet and the packet core to establish communications with the at least one terminating UE (block 224).

In further related aspects, establishing (block 206) may involve receiving group formation instructions from the discovery server (block 230), which may further involve receiving instructions for at least one of an automatic trigger for radio frequency (RF) proximity discovery, resource coordination among neighboring P2P groups, P2P group establishment criteria, addition of a member to an existing P2P group, and deletion of a member from an existing P2P group (block 232). In yet further related aspects, the method 200 may further involve maintaining P2P communication session continuity by reverting to bearer signaling via the packet core (block 240), such as, for example, if the UEs of the P2P group are no longer in RF range (or if they were not within RF range initially and still joined the group via the packet core). In still further related aspects, transmitting to and receiving from the serving node is in accordance with E-UTRA protocols or the like.

Figure 2C:
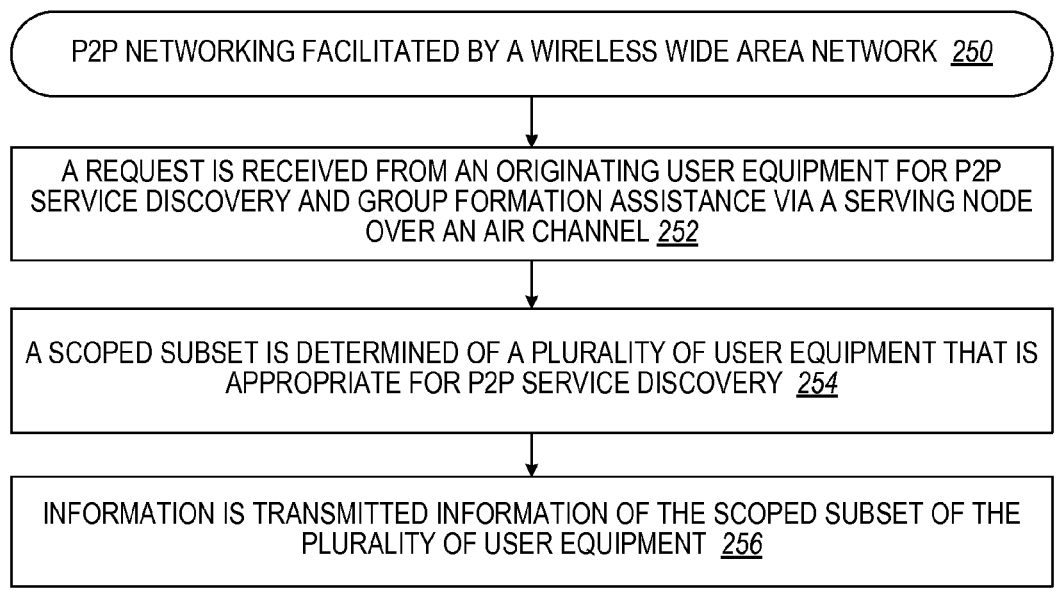
FIG. 2C illustrates an example P2P networking methodology executable by a network entity.

With reference to FIG. 2C, there is shown a methodology 250 for P2P networking, operable by a network entity or the like, that may be facilitated by a WWAN. A request may be received from an originating UE for P2P service discovery and group formation assistance via a serving node over an air-interface channel (block 252). A scoped subset of a plurality of UEs that are appropriate for P2P service discovery may be determined or identified by the network entity (block 254). The network entity may transmit information of the scoped subset of the plurality of UEs (block 256), such as, for participating in RF discovery (i.e., to determine if the UEs of the scoped subset are within RF range).

Figure 2D:
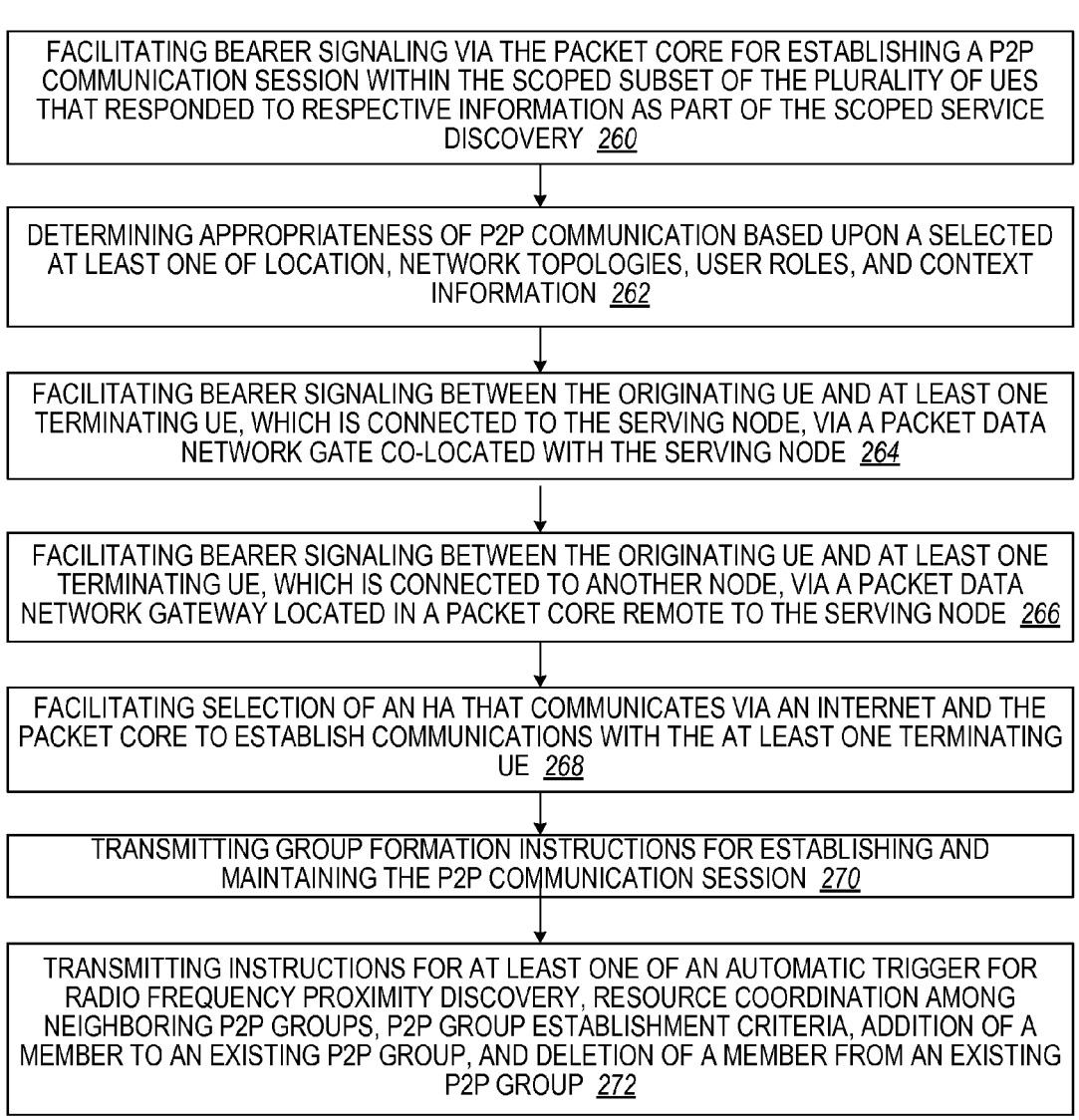
FIG. 2D illustrates further aspects of the methodology of FIG. 2C.

With reference to FIG. 2D, there are shown further operations or aspects of the method 250 that are optional and may be performed by a network entity or the like for P2P networking. If the method 250 includes at least one block of FIG. 2D, then the method 200 may terminate after the at least one block, without necessarily having to include any subsequent downstream block(s) that may be illustrated. It is further noted that numbers of the blocks do not imply a particular order in which the blocks may be performed according to the method 250. For example, the method 250 may further involve facilitating bearer signaling via the packet core for establishing a P2P communication session within the scoped subset of the plurality of UEs that responded to respective information as part of the scoped service discovery (block 260). In related aspects, determining (at block 254) may involve determining appropriateness of P2P communication based upon a selected at least one of location, network topologies, user roles, and context information (block 262).

In further related aspects, the method 250 may further involve facilitating bearer signaling between the originating UE and at least one terminating UE, which is connected to the serving node, via a packet data network gate co-located with the serving node (block 264). In the alternative, the method 250 may further involve facilitating bearer signaling between the originating UE and at least one terminating UE, which is connected to another node, via a packet data network gateway located in a packet core remote to the serving node (block 266), and facilitating selection of an HA that communicates via an Internet and the packet core to establish communications with the at least one terminating UE (block 268).

In yet further related aspects, the method 250 may further involve transmitting group formation instructions for establishing and maintaining the P2P communication session (block 270). Transmitting (block 270) may involve transmitting instructions for at least one of an automatic trigger for radio frequency proximity discovery, resource coordination among neighboring P2P groups, P2P group establishment criteria, addition of a member to an existing P2P group, and deletion of a member from an existing P2P group (block 272). In still further related aspects, transmitting from and receiving at the serving node is in accordance with E-UTRA protocols or the like.

Figure 3:
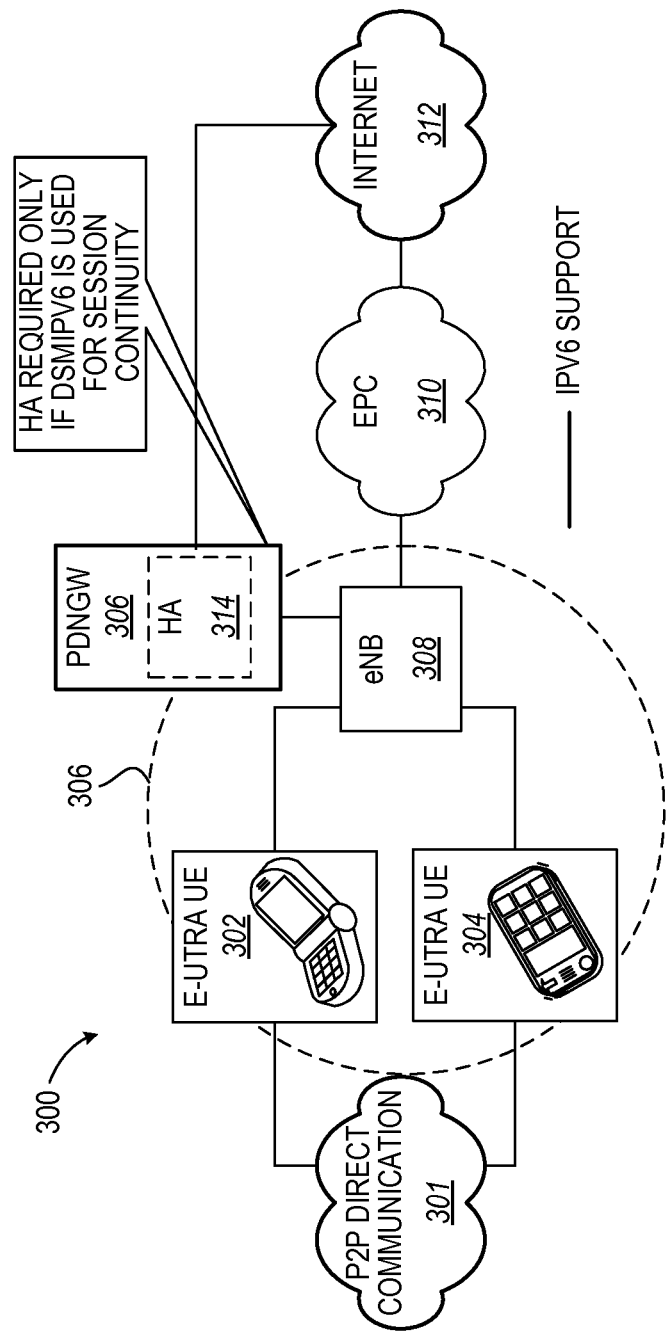
FIG. 3 illustrates a schematic diagram for an optimized Evolved Packet System (EPS) network architecture for LTE P2P direct communication.

NETWORK ARCHITECTURE: With reference to FIG. 3, there is shown an optimized EPS network architecture 300 for LTE P2P direct communication 301 between UEs 302, 304, wherein a PDNGW 306 is co-located with an eNB 308. The architecture also includes an EPC that interfaces with a core network, depicted as Internet 312. In one aspect, the UEs 302, 304 may communicate using LTE via IP version 6 (IPV6) or the like. Such an implementation may be desirable when the LTE P2P UEs 302, 304 in a group are in the same cell 306 or in different cells belonging to or associated with the same eNB 308. With the shown architecture 300, it is possible to avoid having excessive amounts of P2P traffic routed through an EPC 310 when the UEs 302, 304 in the group are not within RF proximity of each other, resulting in less delay. Note that even if the UEs 302 and 304 are in different cells belonging to different eNBs, the PDNGW 306 co-located with the eNB 308 can still be used for the P2P type-1 EPS bearer establishment for both UEs if there is a connection between the eNB 308 the other eNB (i.e., an X2 interface exists between the eNBs). In related aspects, there are two PDN connections for the implementation shown in FIG. 3. In further related aspects, an HA 314 may be included if DSMIPv6 is used for session continuity.

Figure 4:
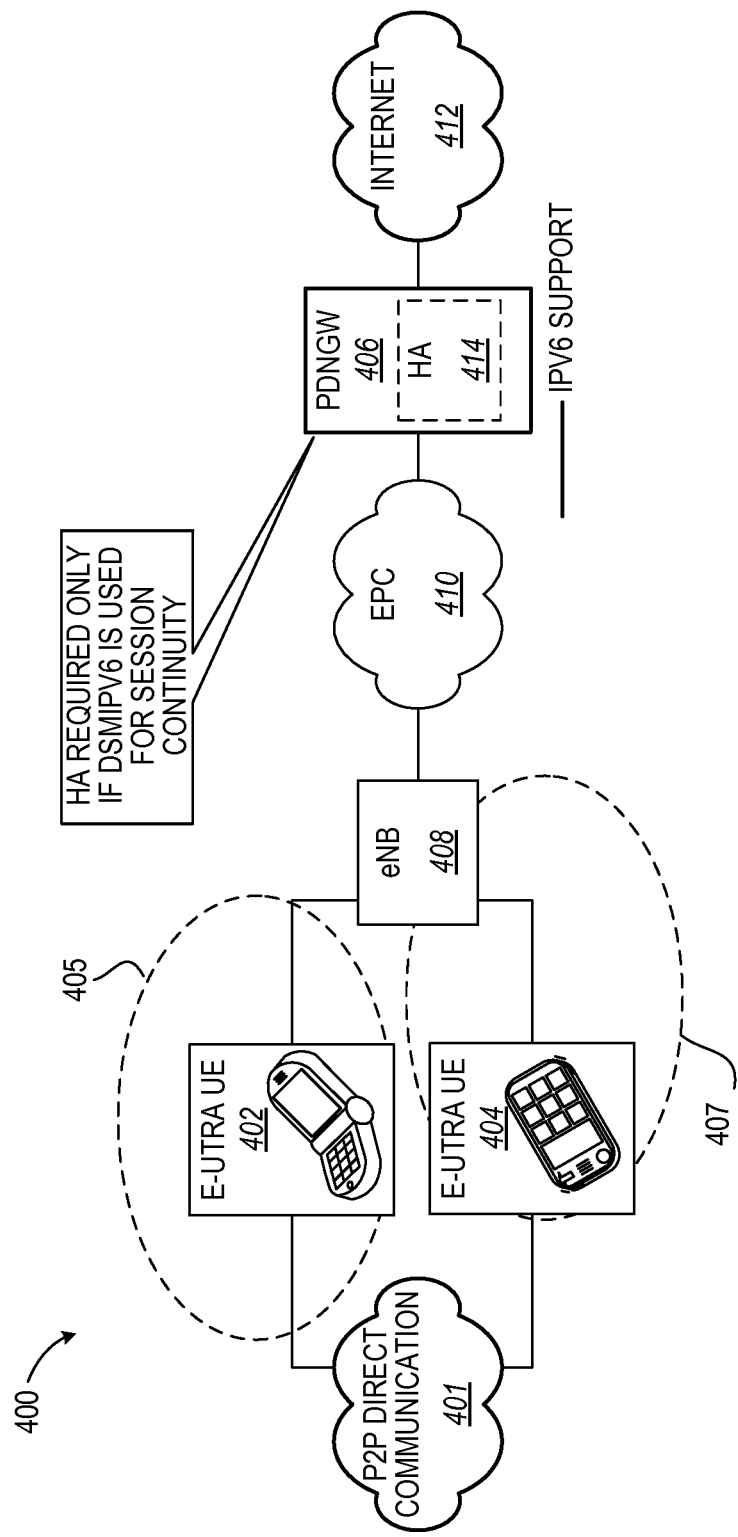
FIG. 4 illustrates a schematic diagram for a non-optimized Evolved Packet System (EPS) network architecture for LTE P2P direct communication.

With reference to FIG. 4, there is shown a non-optimized EPS network architecture for LTE P2P communication 401 for LTE P2P direct communication 401 between UEs 402, 404, wherein a PDNGW 406 is not co-located with an eNB 408. Such an implementation may be desirable when the LTE P2P UEs 402, 404 in a group are in different cells 405, 407 belonging to different eNBs (intra- or inter-operator) (e.g., eNB 408 for the cell 407) and there is no connection (i.e., X2 interface) between the eNBs. Here, the P2P traffic may be routed through an EPC 410 that interfaces with a core network depicted as Internet 412, wherein the UEs 402, 404 in the group are not within RF proximity of each other. The UEs 402, 404 may experience more delay than for a co-located PDNGW. In related aspects, there is one PDN connection for the implementation shown in FIG. 4. In further related aspects, an HA 414 (co-located with PDNGW 406) may be included if DSMIPv6 is used for session continuity.

Figure 5:
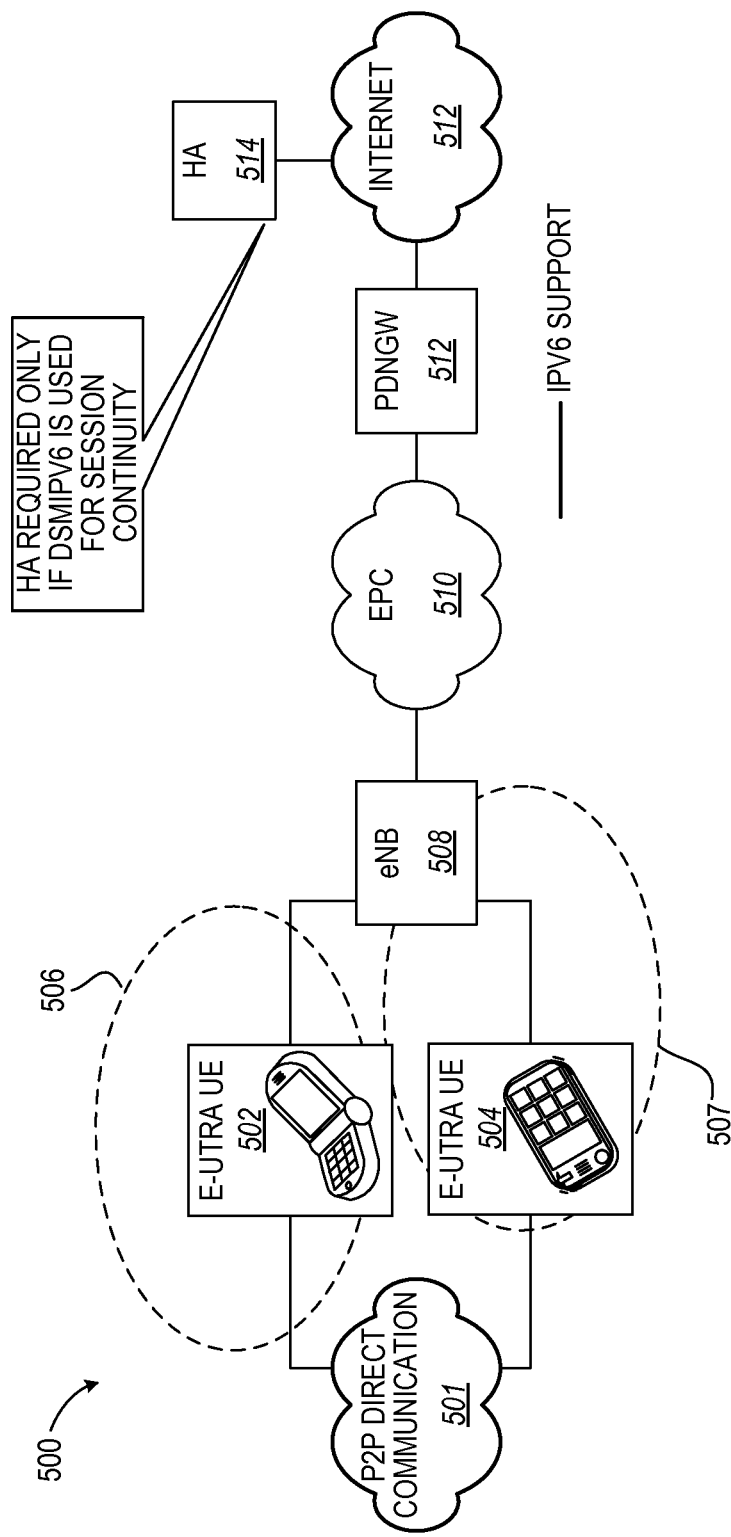
FIG. 5 illustrates a schematic diagram for an EPS network architecture having a packet data network gateway (PD-NGW) co-located with an evolved Base Node (eNB).

With reference to FIG. 5, there is illustrated another non-optimized EPS network architecture 500 for LTE P2P communication 501 between UEs 502, 504, wherein a PDNGW 506 is located outside of an eNB 508. Such an implementation may be desirable when the LTE P2P UEs 502, 504 are in a group in different cells 506, 507 belonging to different eNBs (intra- or inter-operator) (e.g., eNB 508 for cell 507) and there is no connection (i.e., X2 interface) between the eNBs. P2P traffic may be routed through an EPC 510 that interfaces with a core network depicted as Internet 512 when the UEs 502,

504 in a group are not within RF proximity of each other. An HA 514 (not co-located with PDNGW 512) that is external to the EPC 510 may be included if DSMIPv6 is used for session continuity.

Figure 6:
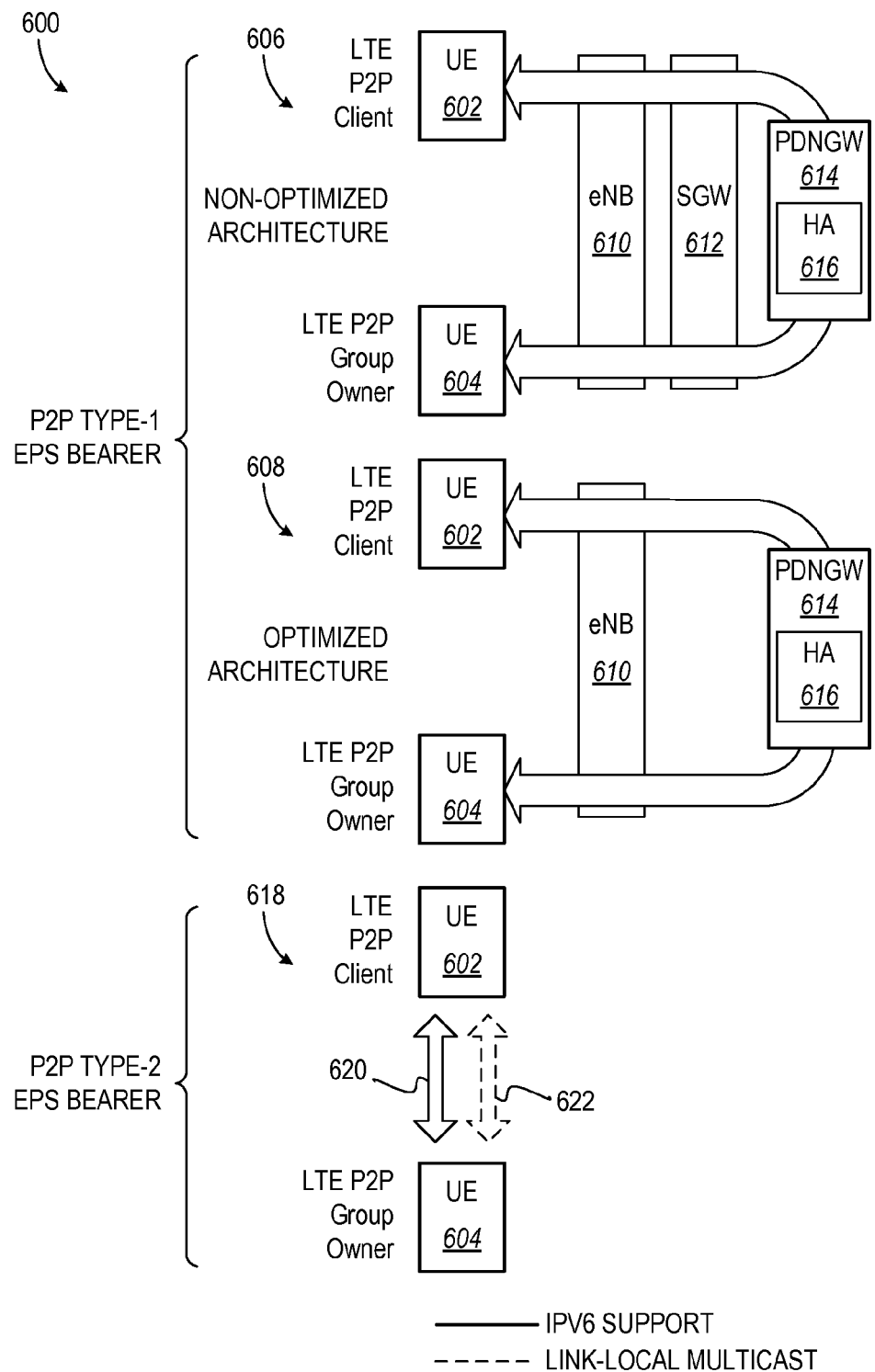
FIG. 6 illustrates a schematic diagram for an EPS network architecture having a PDNGW located in an Evolved Packet Core (EPC).

BEARER ARCHITECTURE: With reference to FIG. 6, there are shown examples of bearer architecture 600 for supporting an LTE P2P client as a first UE 602 and an LTE P2P group owner as a second UE 604 when communicating via a P2P type-1 EPS bearer, such as a non-optimized architecture 606 or an optimized architecture 608. The former may include an eNB 610 and a serving gateway 612, as well as a PDNGW 614 which can include an HA 616. The latter may omit an SGW. Both the non-optimized architecture 606 and the optimized architecture 608 provide IPV6 support for communication between the first and second UEs 602, 604.

The bearer architecture 600 may also support a P2P type-2 EPS bearer depicted at 618, wherein the UEs 602, 604 may communicate via unicast 620 (e.g., IPV6 support) or multicast 622 (e.g., link-local multicast) information delivery. In related aspects, the P2P type-1 EPS bearer may be for session continuity, whereas the P2P type-2 EPS bearer may be for when the UEs 602, 604 are within RF range of each other.

Figure 7:
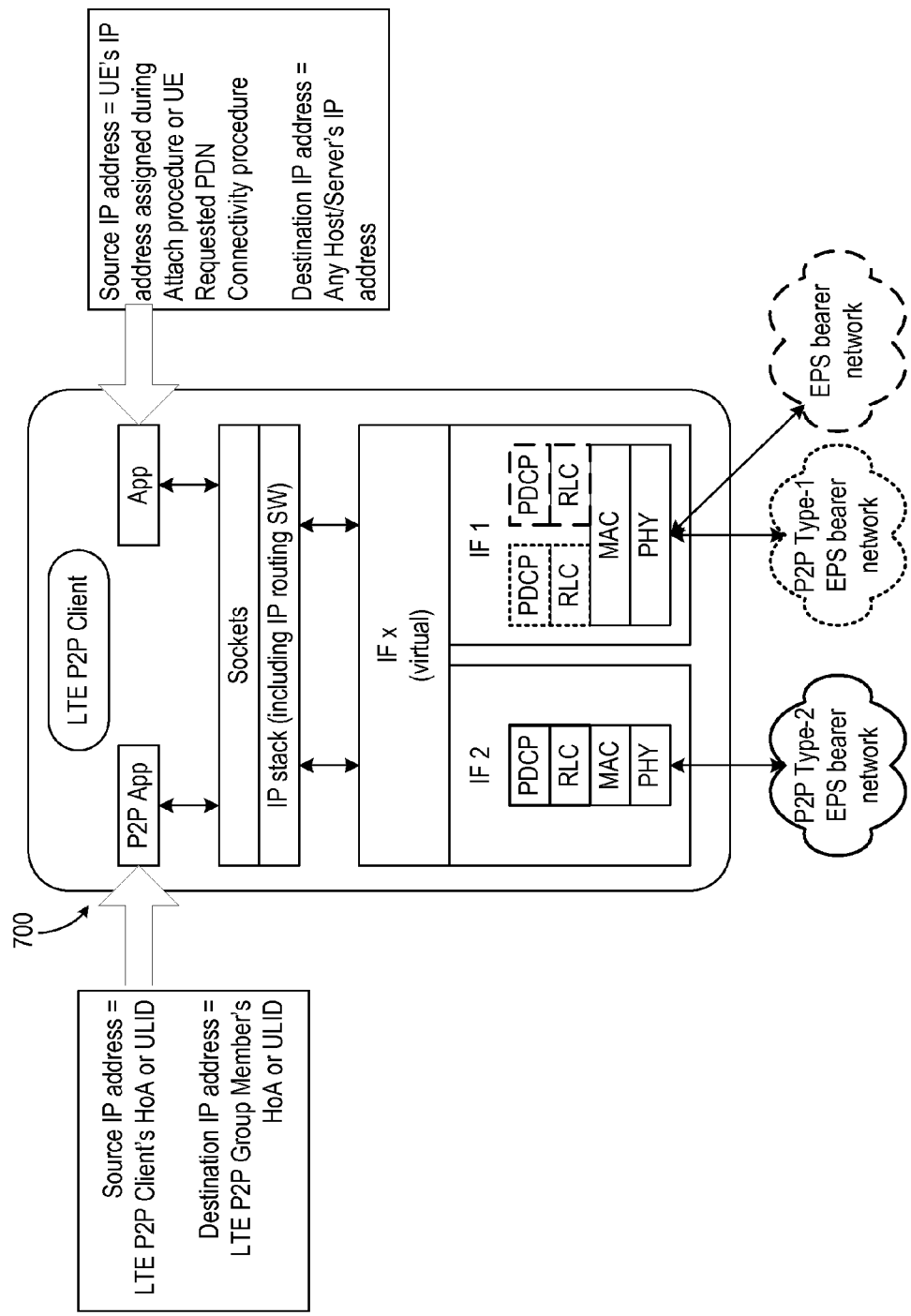
FIG. 7 illustrates a schematic diagram for an EPS network architecture having a home agent (HA) located in a core network.
Figure 8:
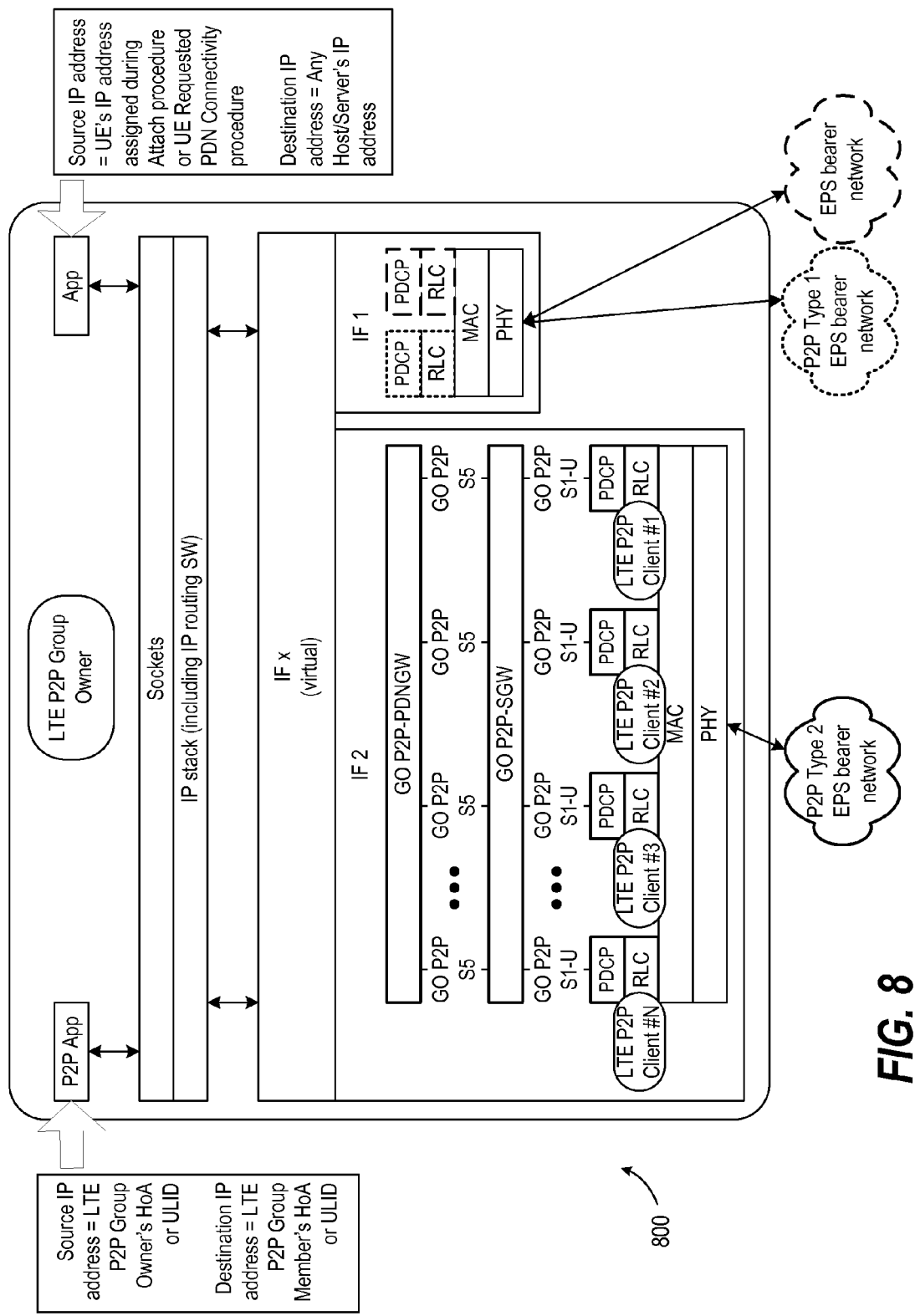
FIG. 8 illustrates a schematic diagram of an LTE P2P group owner device architecture-user plane.
Figure 9:
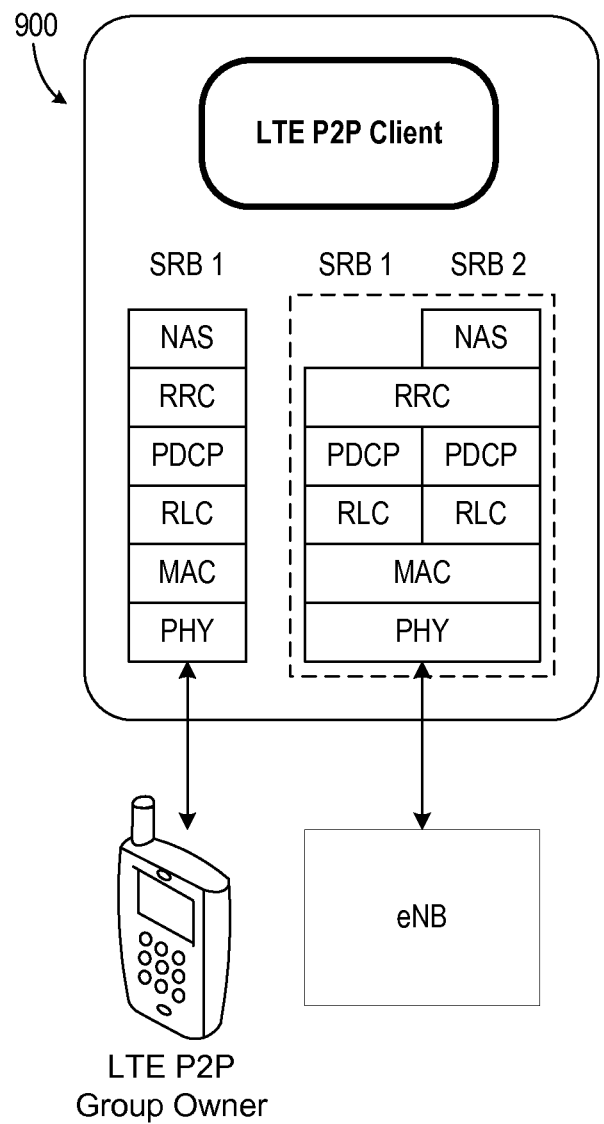
FIG. 9 illustrates a schematic diagram of an LTE P2P client device architecture-control plane.

In related aspects, details regarding the protocol and data architecture are shown in FIGS. 7-10. With reference to FIG. 7, there is provided an embodiment of an LTE P2P client device (i.e., client UE) architecture 700, with aspects of the user plane depicted. In this embodiment, at the P2P application of the client device, the source IP address may be an LTE P2P client home address (HoA) or upper-layer identifier (ULID), whereas the destination IP address may be the LTE P2P group member's HoA or ULID. It is noted that HoA may be used if DSMIPv6 is used for session continuity, and that ULID may be used if Shim6 is used for session continuity. At the LTE application, the source IP address may be the UE's IP address assigned during an Attach procedure or a UE requested PDN connectivity procedure, whereas the destination IP address may be the host/server's IP address. FIG. 9 shows aspects of the control plane for an LTE P2P client device architecture 900, including the Signaling Radio Bearers (SRBs) for Radio Resource Control (RRC) and Non-Access-Stratum (NAS) signaling between an Radio Network Controller (RNC) and an UE.

Figure 10:
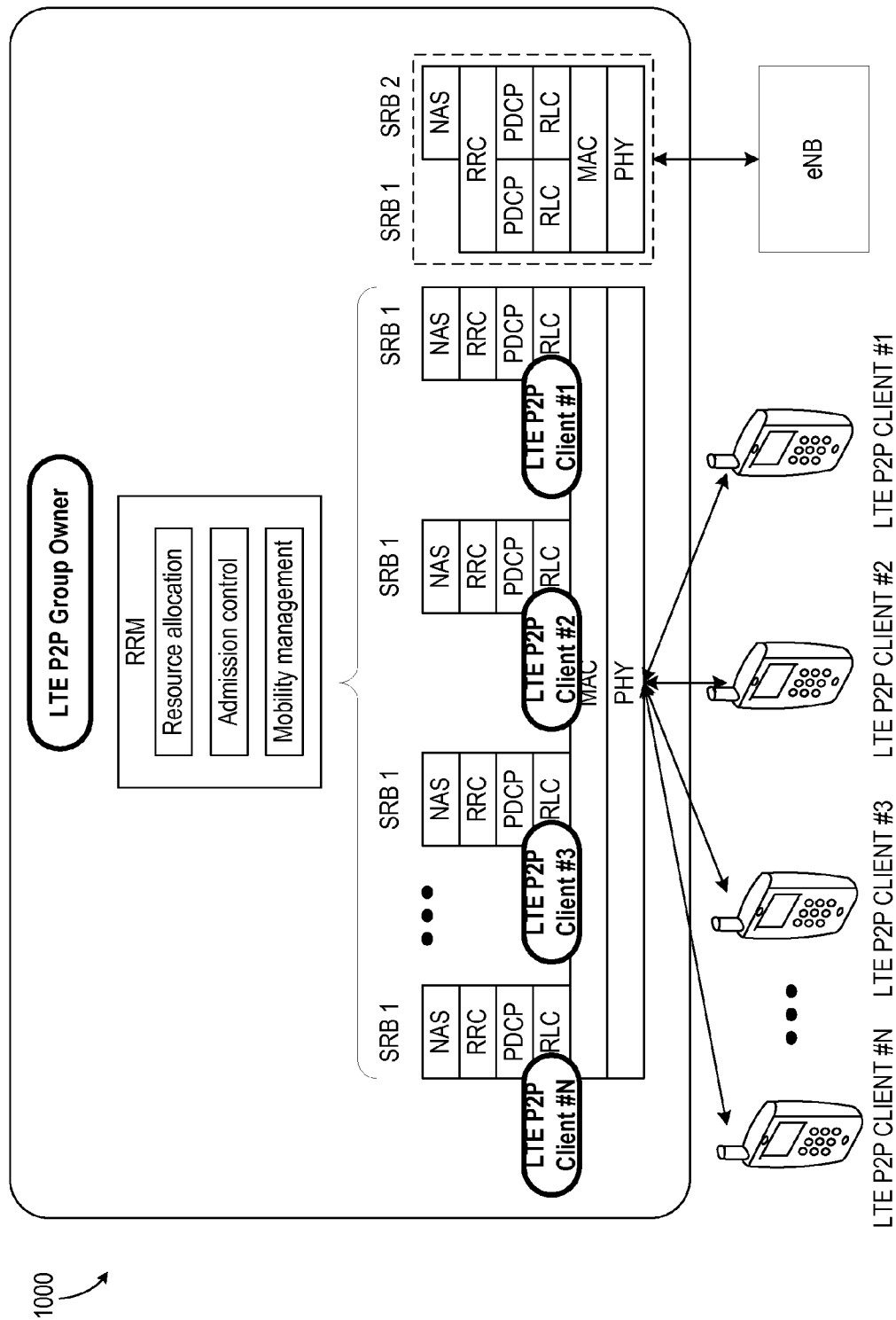
FIG. 10 illustrates a schematic diagram of an LTE P2P group owner device architecture-control plane.

With reference to FIG. 8, there is provided an embodiment of an LTE P2P group owner device (i.e., group owner UE) architecture 800, with aspects of the user plane depicted. In this embodiment, at the P2P application of the group owner device, the source IP address may be an LTE P2P group owner's HoA or ULID, whereas the destination IP address may be the LTE P2P group member's HoA or ULID. HoA may be used if DSMIPv6 is used for session continuity, and ULID may be used if Shim6 is used for session continuity. At the LTE application, the source IP address may be the UE's IP address assigned during an Attach procedure or a UE requested PDN connectivity procedure, whereas the destination IP address may be the host/server's IP address. FIG. 10 shows aspects of the control plane for an embodiment of an LTE P2P group owner device architecture 1000.

SERVICE DISCOVERY: The techniques described herein address LTE P2P service discovery by providing a "scoped" wide-area Internet unicast service discovery and registration in addition to link-local multicast service discovery. Manual and automatic selection options may be provided. Proper discovery scopes minimize or avoid unnecessary computation on clients, services, and directories. The scope of discovery may be based on location, network topologies, user roles, context information, or combinations of such information to help properly define service discovery session targets. Although discovery scopes limit the number of service matches, a discovery result might still contain a list of matched services. Further, a service discovery protocol may allow for manual or automatic selection options based upon the type of P2P application being activated.

In related aspects, service registration information can include: scope; UE FQDN (or IP address(es)); UE Proximity Detection Signal (PDS) (e.g., "Long Peer-ID" utilizing PHY/Medium Access Control (MAC) protocol layers); list(s) of supported P2P RATs and RAT preferences (e.g., LTE P2P, WiFi Direct, Bluetooth, etc.); list(s) of supported service types and attributes; etc.

Figure 11:
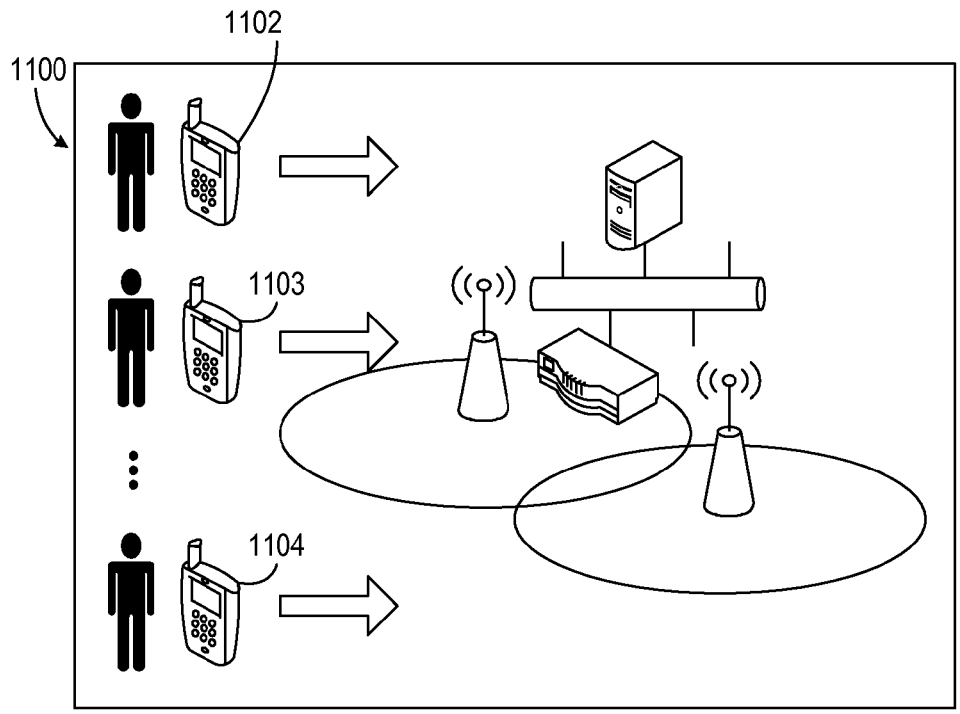
FIG. 11 illustrates a diagram of a first step of a LTE P2P service discovery procedure.
Figure 12:
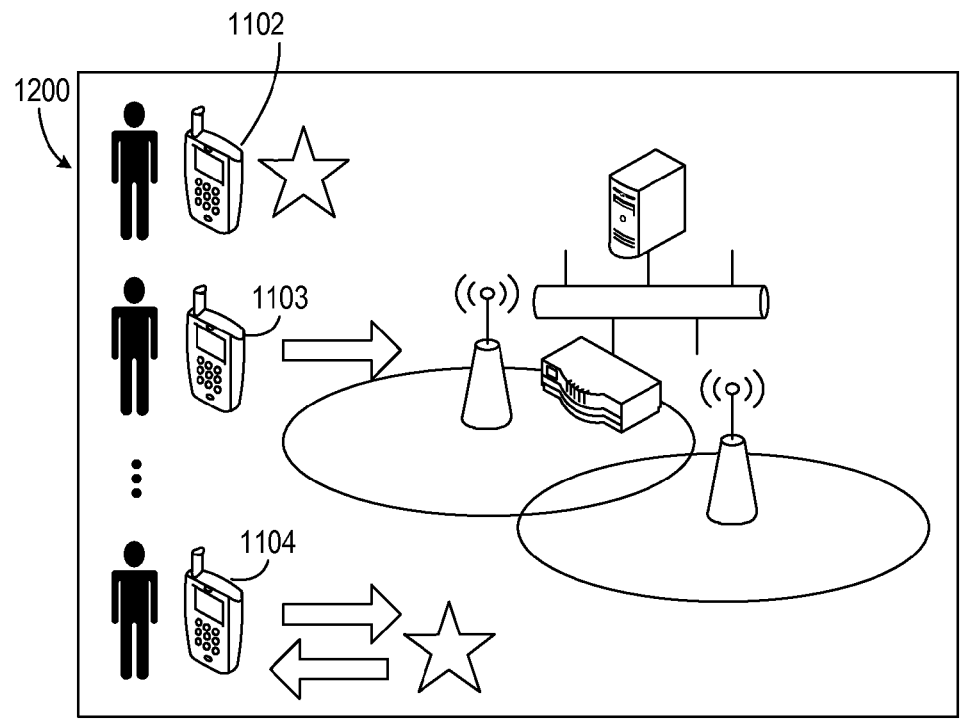
FIG. 12 illustrates a diagram of a second step of a LTE P2P service discovery procedure.

With reference to FIG. 11, there is provided an example of an LTE P2P service discovery procedure. At block 1100, UEs 1102-1104 may register or update their "scoped" P2P services and attributes (e.g., stored on a discovery server or the like). With reference to FIG. 12, at subsequent block 1200, a given UE 1103 may request "scoped" P2P service and attributes for its P2P application (e.g., "MyP2Papp"), and a result may be returned to the given UE 1103. The discovery server may be located within the operator EPC or may be external to it, wherein latter implementation allows an independent application vendor to develop and deploy LTE P2P applications independent of the operator.

GROUP FORMATION: The techniques described herein address LTE P2P group formation with an RF proximity application and a protocol to carry messages between UEs. The protocol may be either network-independent (e.g., REST-based) or network-dependent (e.g., LTE RRC signaling-based). The LTE P2P group formation may provide: automatic trigger for RF proximity discovery; resource coordination among neighboring P2P groups; P2P group establishment; addition/deletion of new member(s) to/from an existing P2P group, etc.

Group formation information generally depends upon the type of action being taken, and may encompass whether the originating UE is to transmit or listen to a PDS. In related aspects, a given UE may communicate its desire to be the Group Owner (i.e., Group Owner intent). For example, the Group Owner intent may represented by a 4 bit field where '1111'=strongest desire to be Group Owner, and '0000'=weakest desire to be Group Owner. In the event of a tie, the originating UE may be elected as the Group Owner. In further related aspects, the group formation information may include the UE IP address for the P2P type-1 EPS bearer, the HoA (if DSMIPv6 is used), the ULID (if Shim6 is used), as well as additional group formation information.

Figure 13:
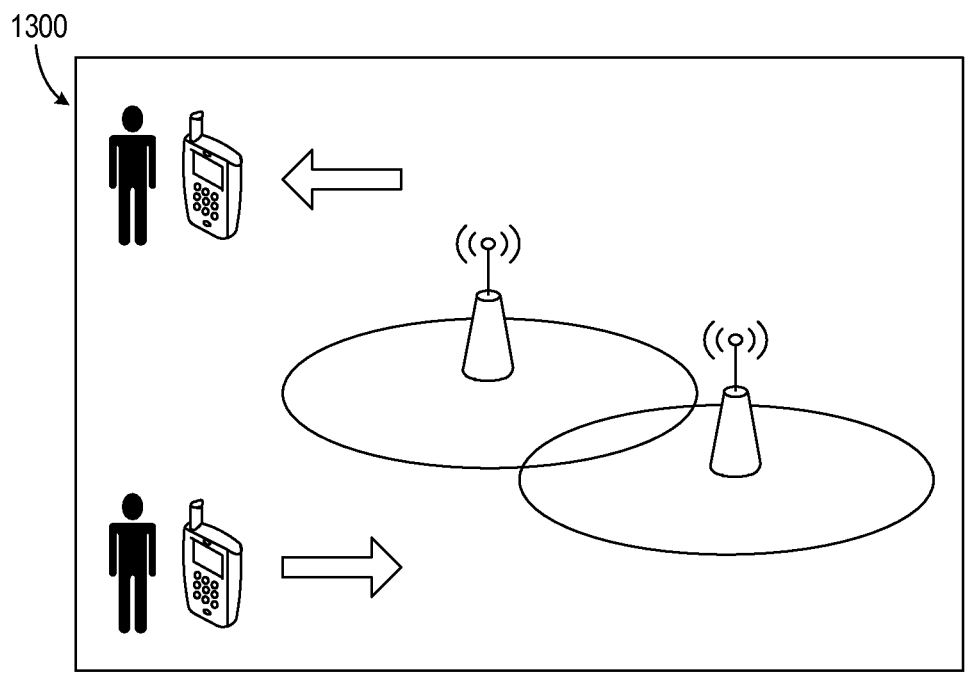
FIG. 13 illustrates a diagram of a first step of a LTE P2P group formation procedure.
Figure 14:
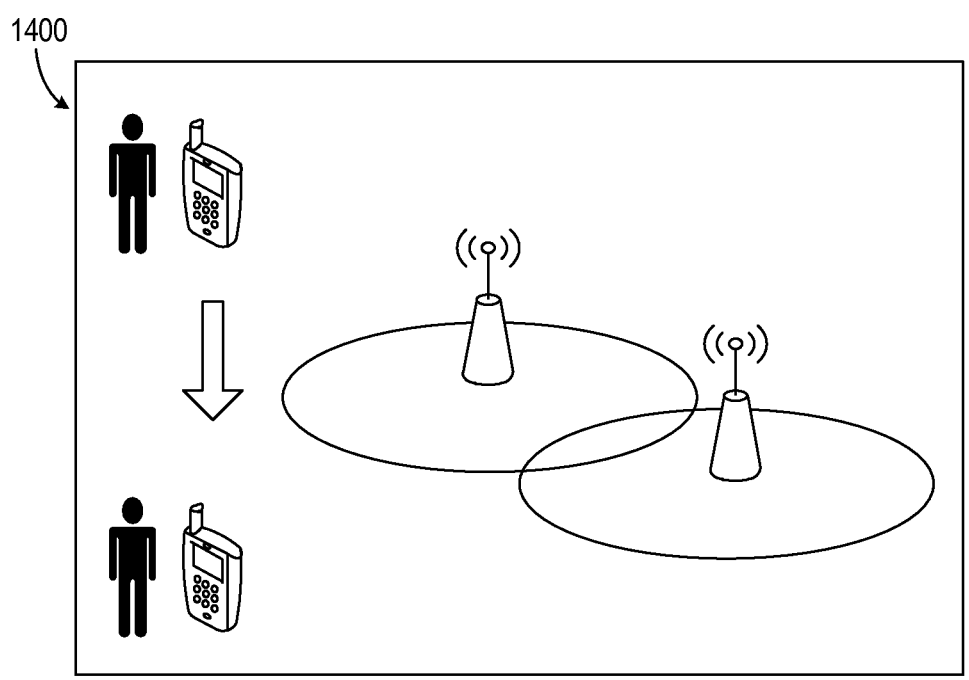
FIG. 14 illustrates a diagram of a second step of a LTE P2P group formation procedure.

For example, in FIG. 13, an LTE P2P group formation procedure for trigger RF proximity discovery is depicted in block 1300. After performing service discovery, a first user (shown on the bottom) requests, via an EPS bearer, that a second user (shown on the top) transmit its PDS. In FIG. 14, block 1400 depicts the second user transmitting its PDS to the first user, via a P2P type-1 EPS bearer.

The LTE P2P group formation mechanisms can be network-independent while supporting inter-operator LTE P2P: SOAP over HTTP (it is noted that UPnP uses SOAP over HTTP for device control); REST-based; modification of existing arbitrary/proprietary IPs (e.g., gaming applications); or development of a new IP specifically for this purpose.

With the a network-independent solution, an independent application vendor can develop and deploy their own group formation protocol that is independent of the operator. Alternatively, LTE P2P group formation mechanisms can be network-dependent and/or RAT-dependent, involving the use of RRC (as specified in 3GPP TS 36.331), although this can impose challenges for providing support for inter-operator LTE P2P.

Figure 15:
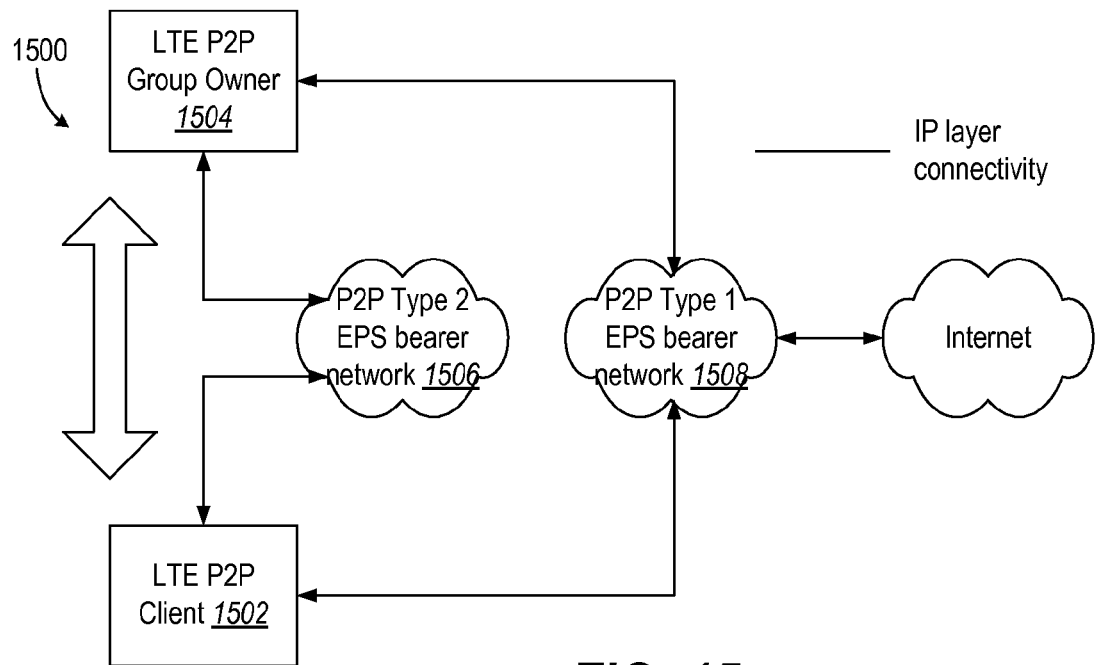
FIG. 15 illustrates a schematic diagram of an LTE P2P network when LTE P2P client and group owner are within RF proximity of each other.
Figure 16:
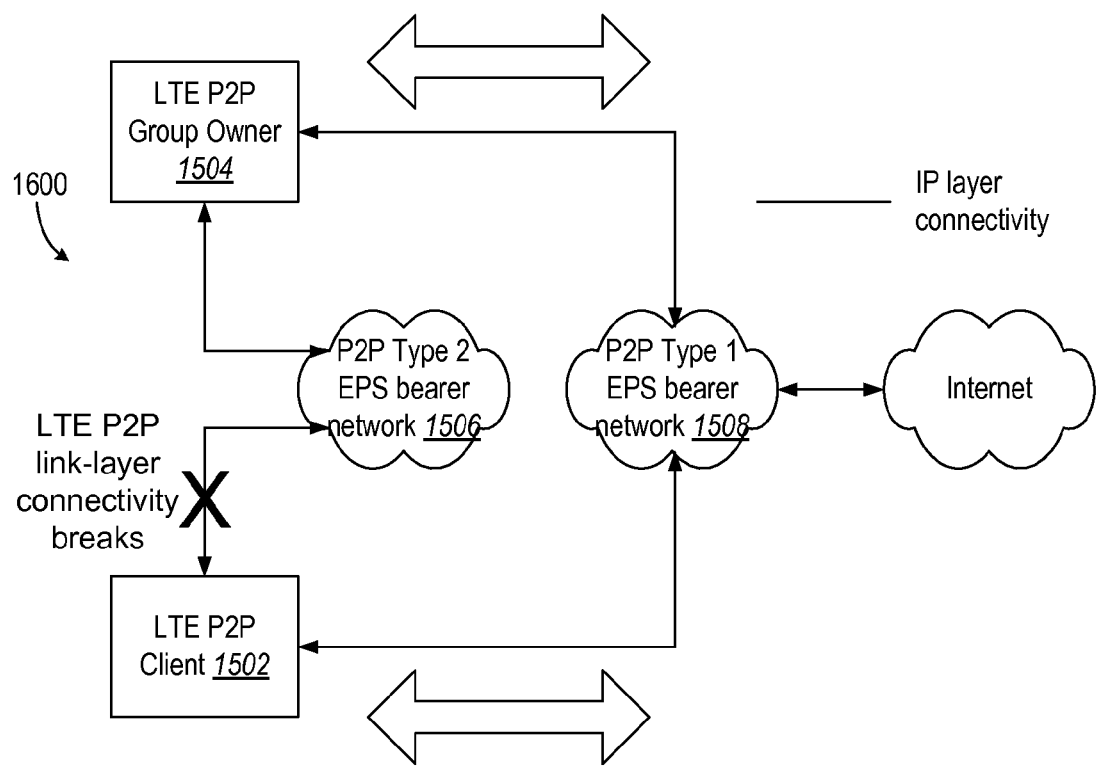
FIG. 16 illustrates a schematic diagram of an LTE P2P network when LTE P2P client and group owner are not within RF proximity of each other.

SESSION CONTINUITY: The present innovation further addresses LTE P2P session continuity by maintaining transparency between a P2P application and the status of the underlying link layer connection. With reference to FIG. 15, for an LTE P2P network 1500, when an LTE P2P client 1502 and a group owner 1504 are within RF proximity of each other, they both use the P2P type-2 EPS bearer network 1506 rather than the P2P type-1 EPS bearer network 1508. With reference to FIG. 16, for a subsequent state of the LTE P2P network depicted at 1600, the LTE P2P link-layer connectivity may break. When the LTE P2P client 1502 and the group owner 1504 are not within RF proximity of each other, they may both use the P2P type 1 EPS bearer network 1508, as shown, thereby maintaining session continuity.

Figure 17:
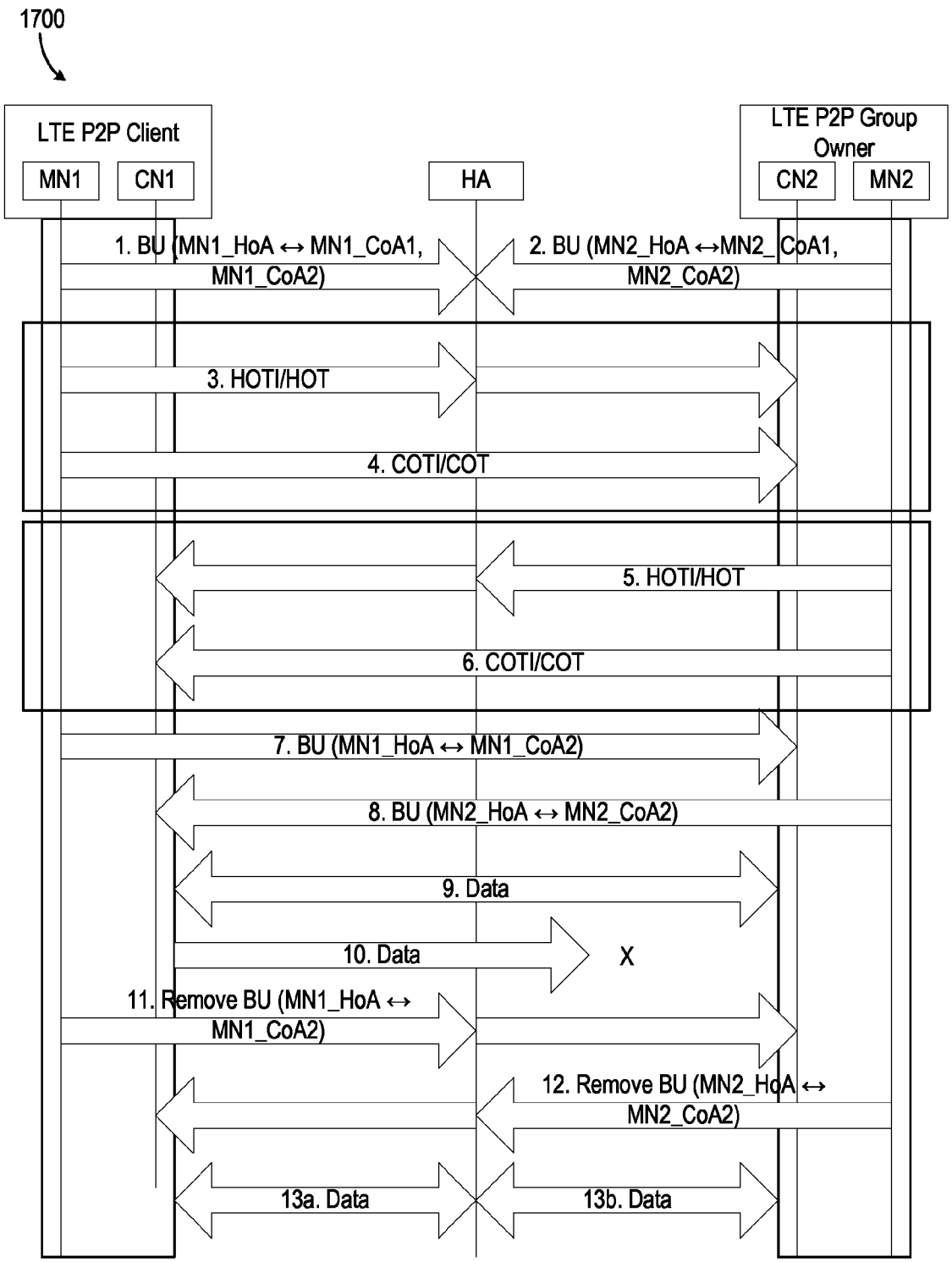
FIG. 17 illustrates a timing diagram for a DSMIPv6 high-level call flow for Radio Link Failure (RLF) of P2P direct communication connection.
Figure 18:
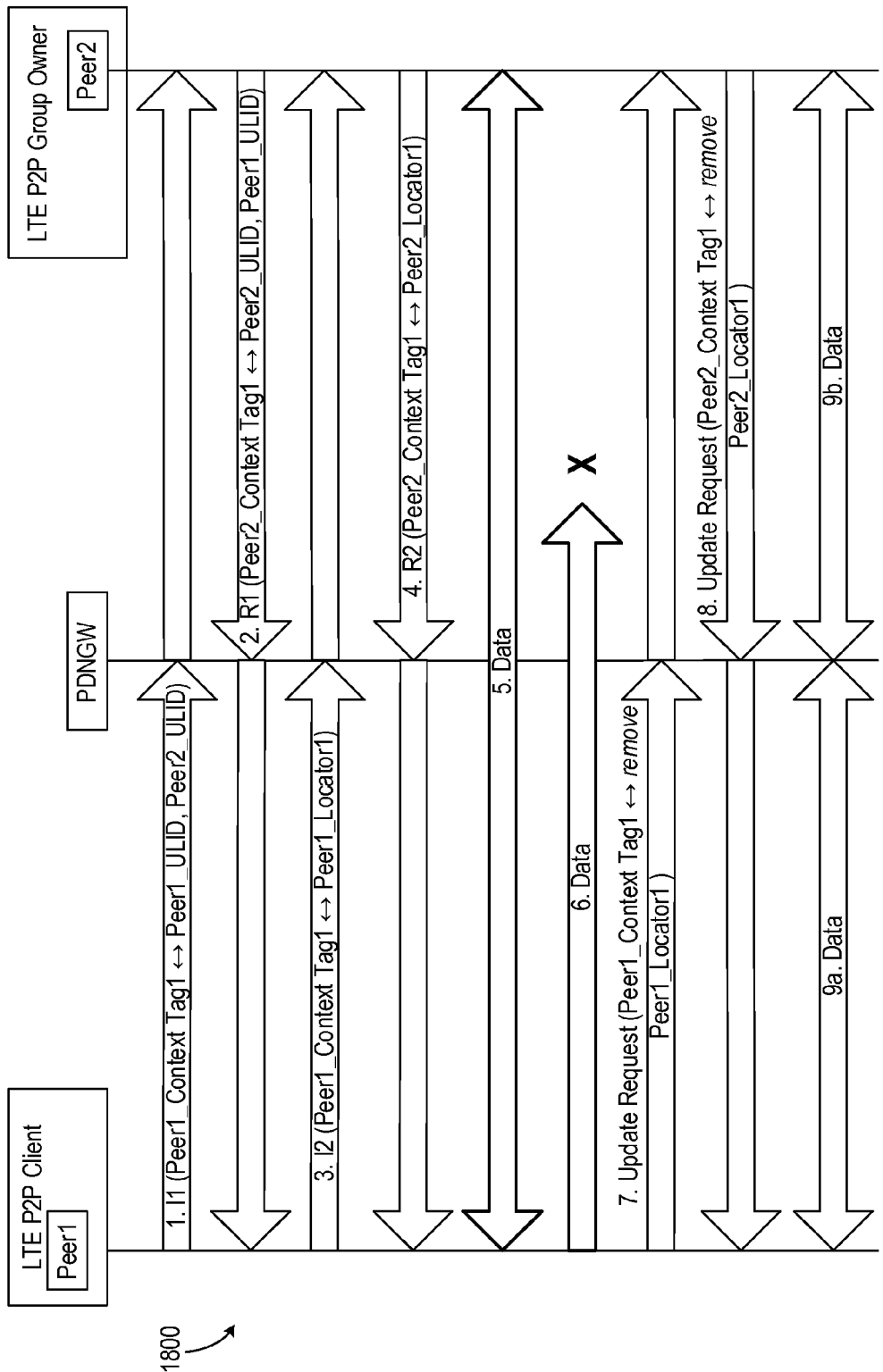
FIG. 18 illustrates a timing diagram for a Shim6 high-level call flow for RLF of P2P Direct Communication Connection.
Figure 19:
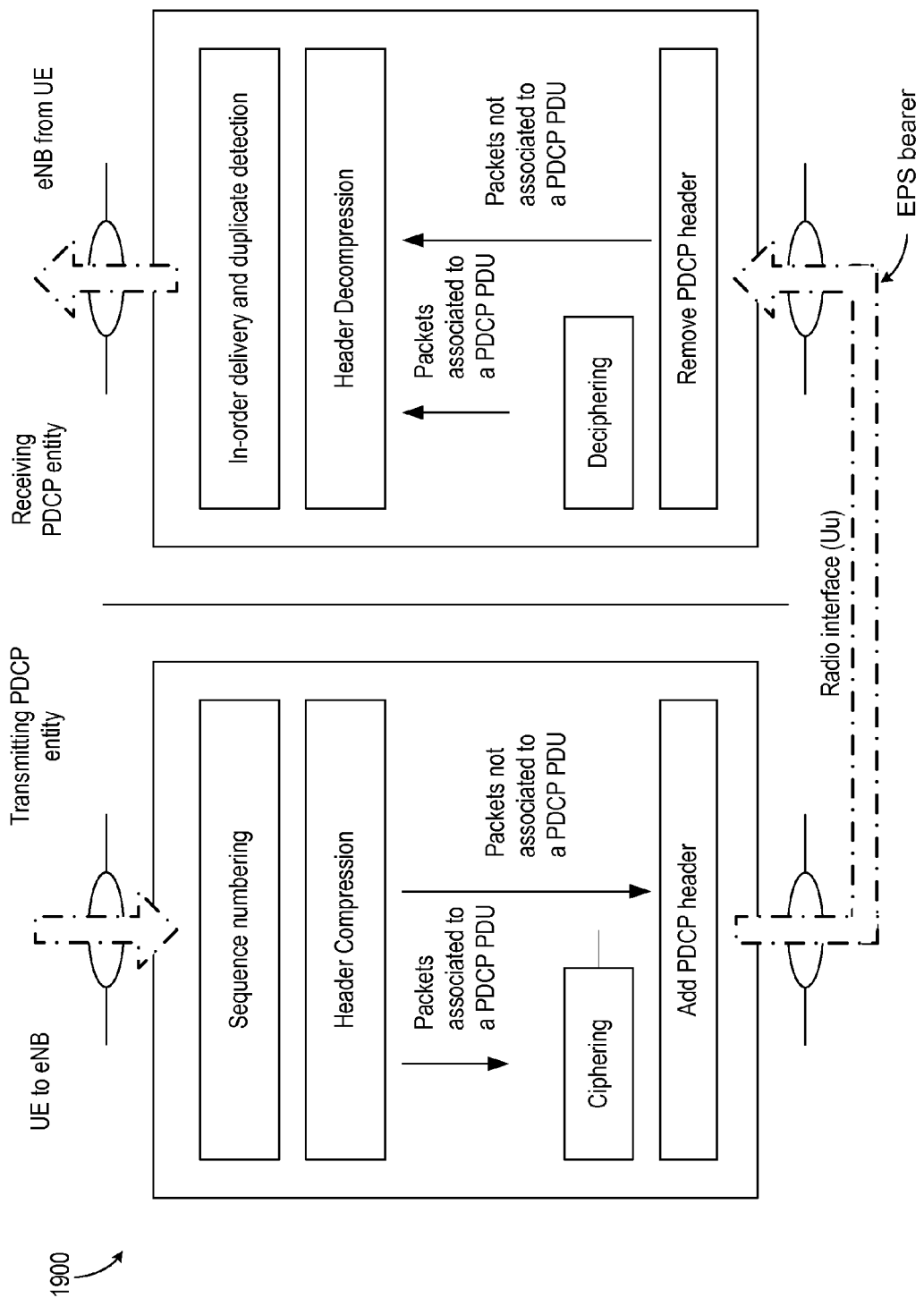
FIG. 19 is a block diagram of an exemplary 3GPP Release 8 PDCP layer, showing the user plane for the EPS bearer.
Figure 20:
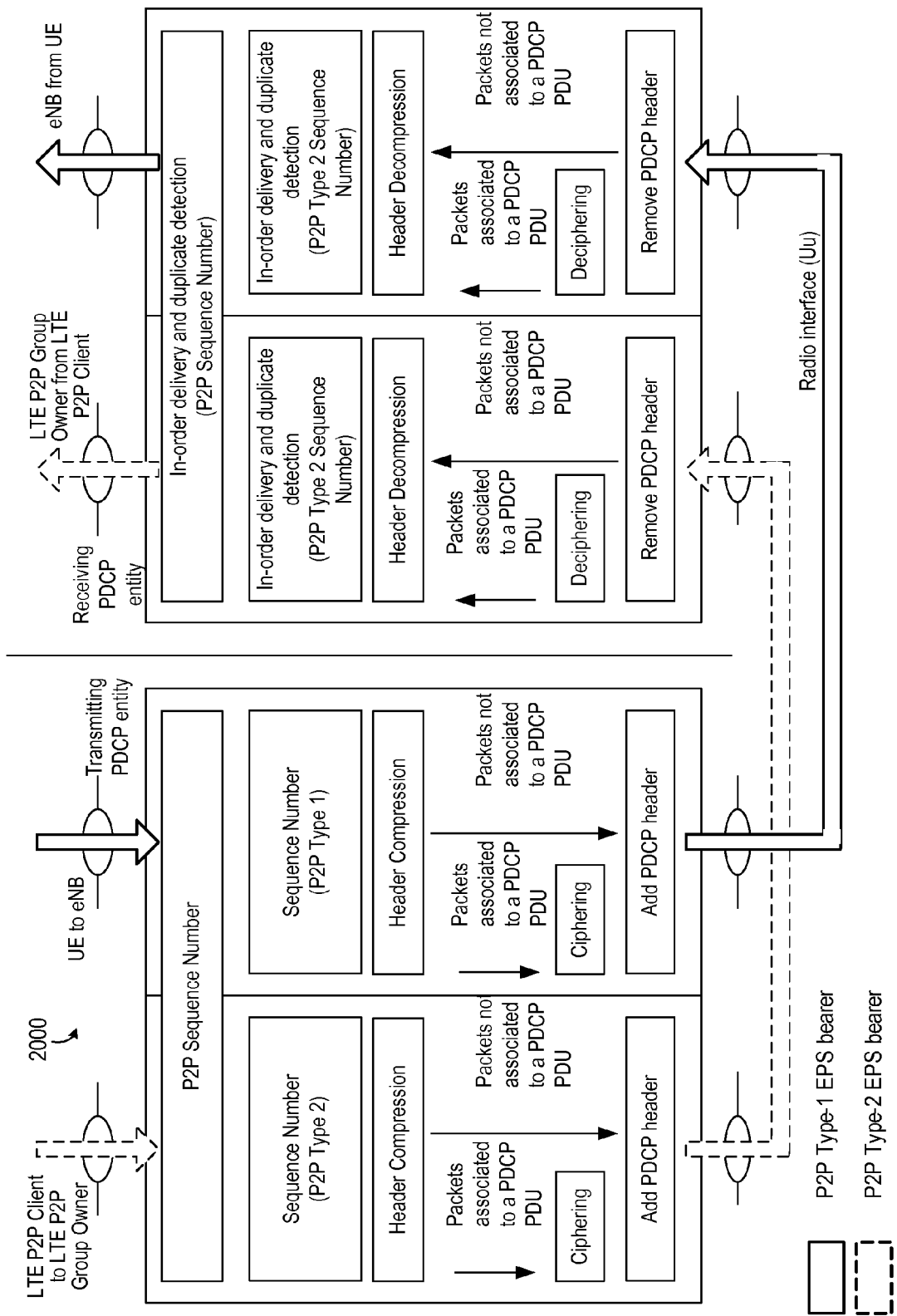
FIG. 20 is a block diagram of an exemplary LTE P2P PDCP layer, showing the user plane for P2P type-1 and 2 EPS bearers.

In related aspects, exemplary LTE P2P Session continuity mechanisms may include a DSMIPv6 protocol or a Shim6 protocol. In FIG. 17, a DSMIPv6 high-level call flow 1700 is depicted for Radio Link Failure (RLF) of a P2P direct communication connection. In FIG. 18, a Shim6 high-level call flow 1800 is shown for an RLF of a P2P direct communication connection. In-order delivery during an RLF of a P2P direct communication connection can be difficult to achieve for all types of P2P RATs, such as, for example, WiFi Direct and Bluetooth. For LTE P2P, it can be achievable by using a new Packet Data Convergence Protocol (PDCP) sequence number that is mapped to both a P2P type-1 and type-2 EPS bearer, in addition to the separate PDCP sequence number assigned to each P2P type-1 and type-2 EPS bearer individually. With reference to FIG. 19, there is provided a block diagram 1900 of a 3GPP Release 8 PDCP layer, showing the user plane for the EPS bearer. With reference to FIG. 20, there is shown a block diagram 2000 of an exemplary LTE P2P PDCP layer, showing the user plane for P2P-type 1 and 2 EPS bearers.

With reference to FIG. 21, there is depicted a 3GPP Release 8 General Packet Radio System (GPRS) Tunneling Protocol User Plane (GTPv1-U) data structure 2100 for header format. In FIG. 22, a PDCP Packet Data Unit (PDU) data structure 2200 for number extension header is depicted. In one embodiment, mandatory fields may include: version; Protocol Type (PT); Extension Header flag (E); Sequence Number flag (S); N-PDU Number flag (PN); length; and Tunnel Endpoint Identifier (TEID). Optional fields may include: sequence number; N-PDU Number; and next extension header type (e.g., '1100 0000'=PDCP PDU number extension header).

The Next Extension Header Type ('1100 000'=PDCP PDU Number extension header) may be used between the eNB and PDNGW and may carry the new PDCP sequence number that is mapped to both a P2P type-1 and type-2 EPS bearer so that in-order delivery can be supported. For example, a serving eNB would receive a packet from an originating UE via a P2P type-1 EPS bearer and would decode that packet using the separate 3GPP Release 8 PDCP sequence number for its P2P type-1 EPS bearer. The eNB would then send that packet to the PDNGW in a GTP-U packet with the header (per above) containing the new PDCP sequence number that is mapped to both the originating UE's P2P type-1 and type-2 EPS bearer. When the serving eNB for the terminating UE receives this GTP-U header, it may reuse the new PDCP sequence number that is mapped to both the originating UE's P2P type-1 and type-2 EPS bearer when the serving eNB sends the packet to the terminating UE. However, it may also encode the packet to the terminating UE with the separate 3GPP Release 8 PDCP sequence number for the terminating UE's P2P type-1 EPS bearer.

With regard to an end-to-end call flow, LTE P2P initial bearer setup between two UEs can encompass a range of situations. In related aspects, the P2P group initial status can be one of the following: neither UE belongs to a group; terminating UE belongs a group; originating UE belongs to a group; or both UEs belong to a group. In further related aspects, UE functionality may include: both UEs supporting LTE and LTE P2P concurrent operation; one UE supporting LTE P2P operation but not LTE operation; and both UEs supporting only LTE P2P operation but not LTE operation. In yet further related aspects, with respect to the eNB, the UEs may be in same eNB, or the UEs may be in different eNBs. In still further related aspects, both UEs may be registered to a same Mobility Management Entity (MME), or the UEs may be registered to different MMEs. In further related aspects, with respect to Private Land Mobile Network (PLMN), the UEs may be in same PLMN, or the UEs may be in different PLMNs. In yet further related aspects, with respect to selection of the terminating UE, this may be done via manual selection by user, or by automatic selection (e.g., RF proximity based).

Figure 23:
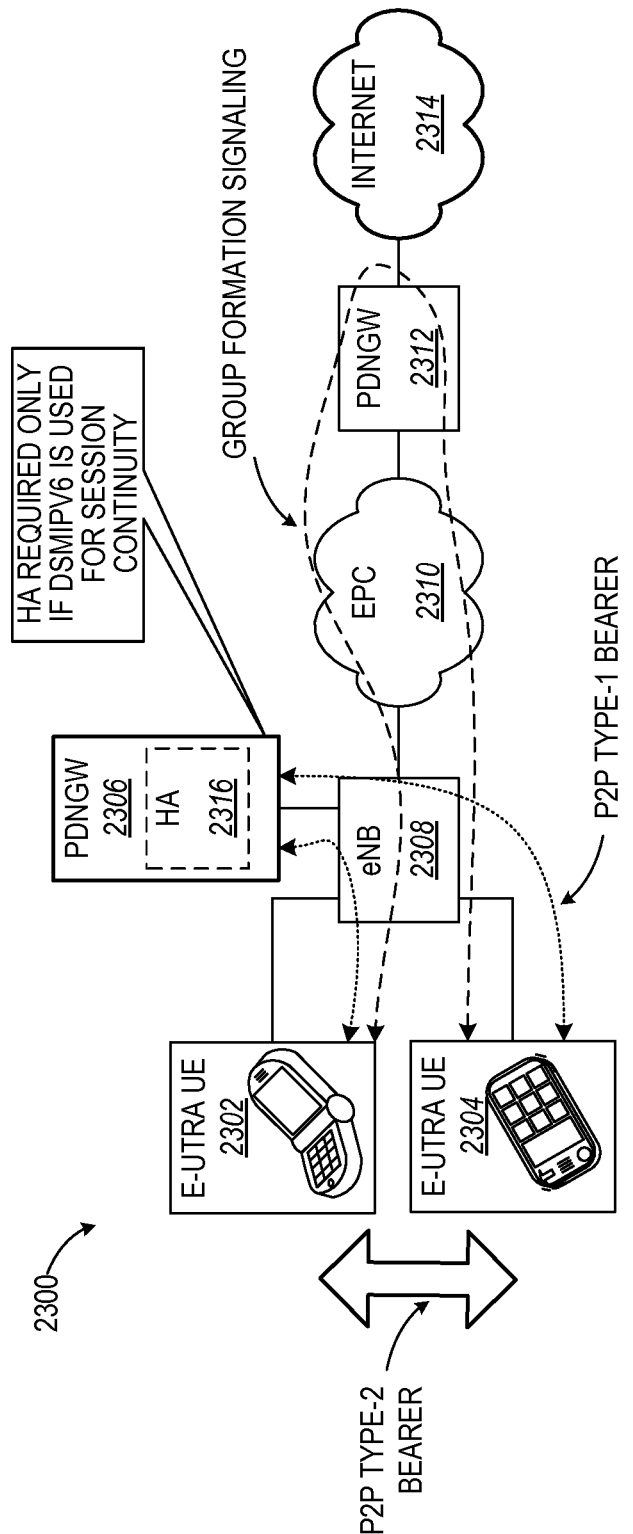
FIG. 23 illustrates a diagram for a scenario for UEs in the same eNB and with an optimized EPS network architecture.
Figure 24:
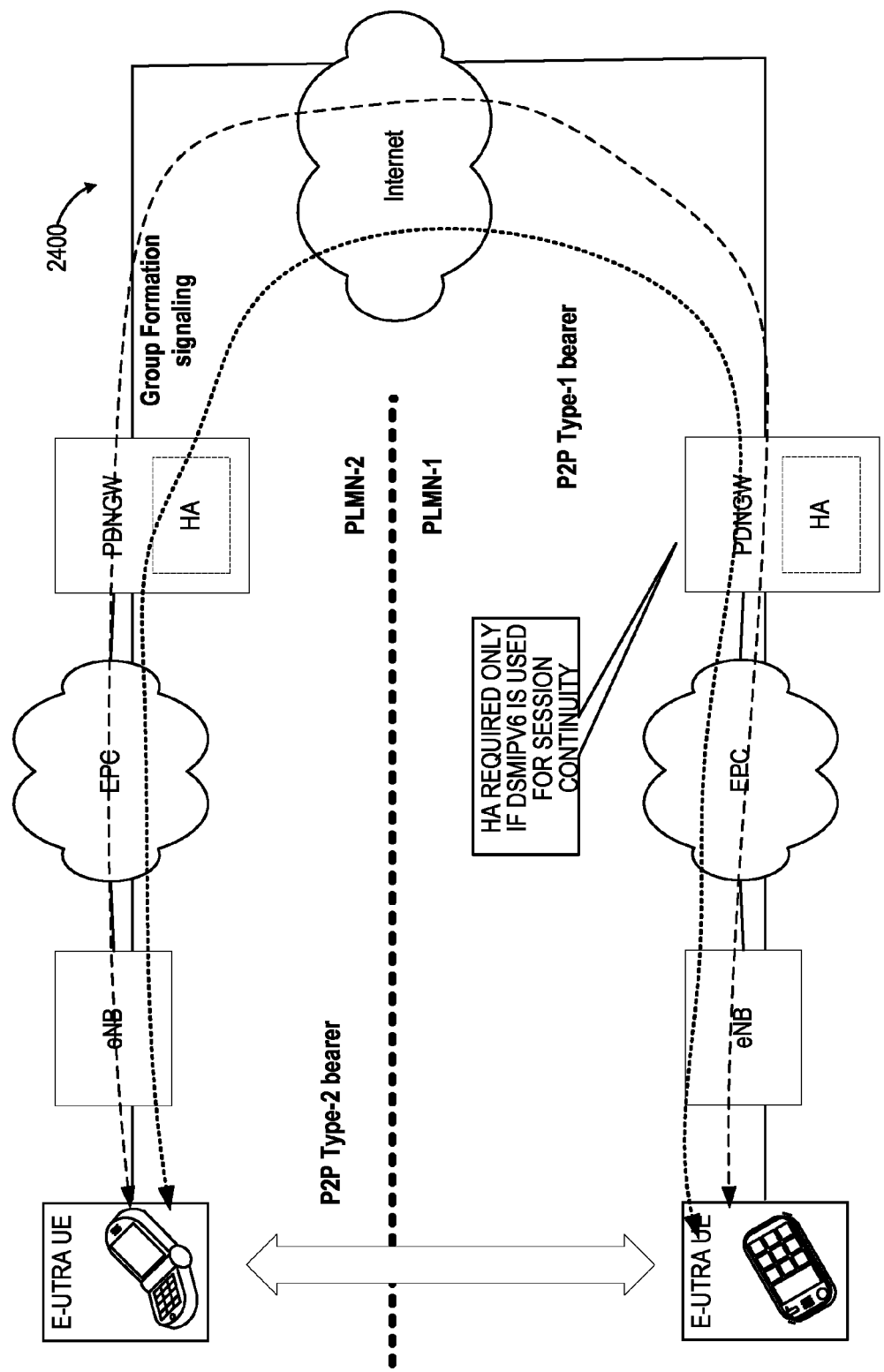
FIG. 24 illustrates a diagram for a scenario for inter-operator and non-optimized EPS architecture for LTE P2P.

In FIG. 23, a scenario is depicted for UEs 2302, 2304 in the same eNB 2308 and with an optimized EPS network architecture 2300 for LTE P2P with an EPC 2310, PDNGW 2306 co-located with the eNB 2308. Also depicted are a PDNGW 2312 outside of the EPC 2310 and an Internet 2314. A HA 2316 can be included in the PDNGW 2306 if required. Also shown are both the P2P type-2 bearer and the P2P type-1 bearer, which together allow for session continuity of the UEs 2302, 2304, even when not in RF proximity of each other. In FIG. 24, a scenario is depicted for inter-operator and non-optimized EPS architecture 2400 for LTE P2P.

LTE P2P bearer setup can employ criteria for a design that works for all cases (inter-operator, UEs in same eNB) and coordinates at the IP layer through REST-based signaling (i.e., HTTP signaling). Alternatively, SIP signaling may be used. Alternatively, a simpler case can be optimized using coordination through RRC signaling (defined in 3GPP TS 36.331) for UEs in the same eNB.

Figure 25:
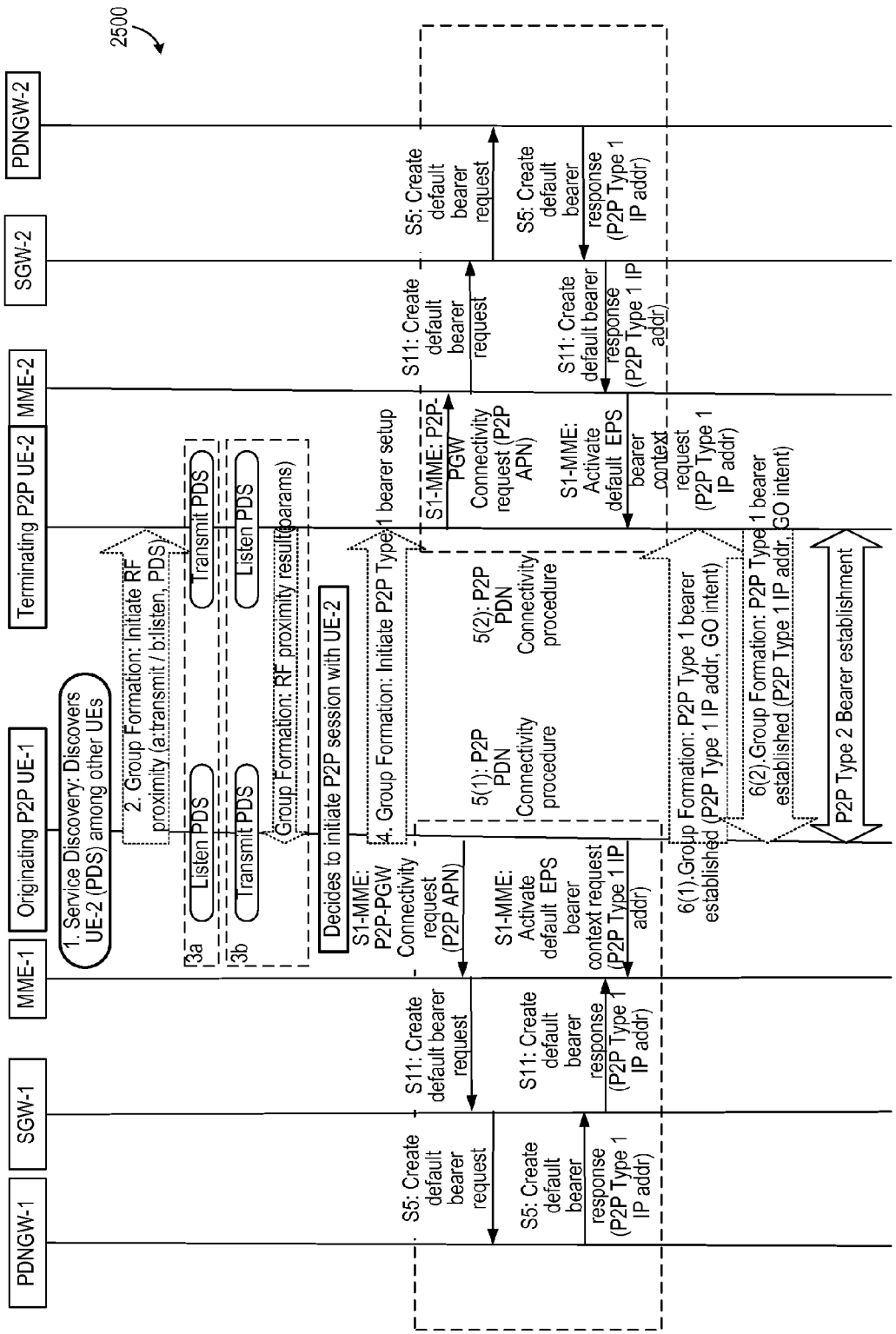
FIG. 25 illustrates a timing diagram of an exemplary end-to-end call flow scenario for LTE P2P bearer setup wherein P2P group status is that UEs do not belong to a group at time of P2P direct communication establishment.

In FIG. 25, there is shown an exemplary end-to-end call flow scenario 2500 for LTE P2P bearer setup wherein the P2P group status is that UEs do not belong to a group at time of P2P direct communication establishment. With respect to UE functionality, both UEs support LTE and LTE P2P concurrent operation. Selection of terminating UE may be RF proximity based. A DSMIPv6 protocol with the HA at the PDNGW can be implemented.

It should be appreciated with a benefit of the present disclosure is that MME-1 and MME-2, SGW-1 and SGW-2, PDNGW-1 and PDNGW-2 may be the same without necessarily changing the call flow. In addition, the P2P type-2 EPS bearer establishment may be coordinated using PHY/MAC design. Further, in step-2 of flow scenario 2500, it is assumed for clarity that a pre-established set of resources has been reserved for LTE P2P common to all eNBs, operators. If not, additional information about frequency band, etc., may be signaled.

Figure 26:
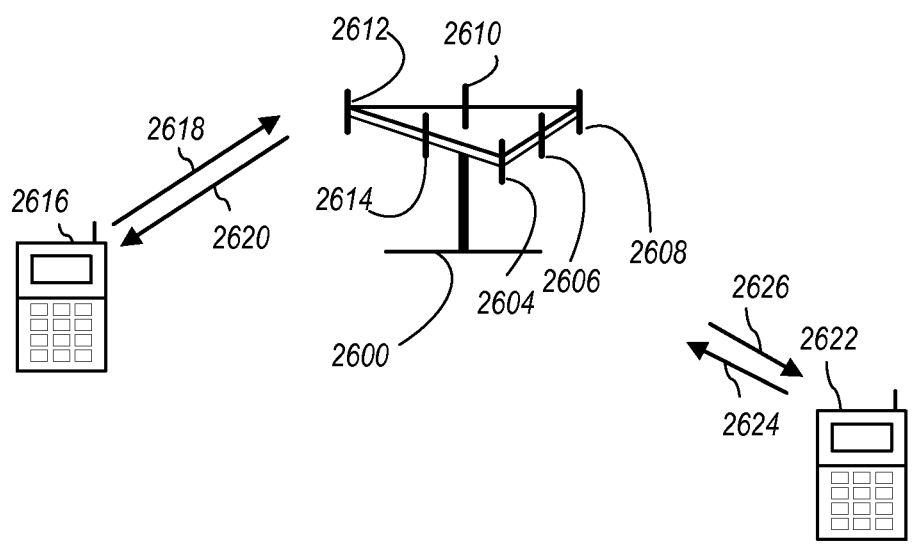
FIG. 26 illustrates a schematic diagram of a multiple access wireless communication system.

Referring to FIG. 26, a multiple access wireless communication system according to one aspect is illustrated. An access point (AP) 2600 includes multiple antenna groups, one including 2604 and 2606, another including 2608 and 2610, and an additional including 2612 and 2614. In FIG. 26, only two antennas are shown for each antenna group, however, more or fewer antennas may be utilized for each antenna group. A UE or access terminal (AT) 2616 is in communication with antennas 2612 and 2614, where antennas 2612 and 2614 transmit information to AT 2616 over forward link 2620 and receive information from AT 2616 over reverse link 2618. AT 2622 is in communication with antennas 2606 and 2608, where antennas 2606 and 2608 transmit information to AT 2622 over forward link 2626 and receive information from AT 2622 over reverse link 2624. In a FDD system, communication links 2618, 2620, 2624 and 2626 may use different frequencies for communication. For example, forward link 2620 may use a different frequency then that used by reverse link 2618.

Each group of antennas and/or the area in which they are designed to communicate is often referred to as a sector of the AP 2600. In the aspect, antenna groups each are designed to communicate to ATs 2616 and 2622 in a sector of the areas covered by AP 2600.

In communication over forward links 2620 and 2626, the transmitting antennas of AP 2600 utilize beam forming in order to improve the signal-to-noise ratio of forward links for the different ATs 2616 and 2622. Also, an AP using beam forming to transmit to ATs scattered randomly through its coverage causes less interference to ATs in neighboring cells than an AP transmitting through a single antenna to all of its ATs.

An AP 2600 may be a fixed station used for communicating with the terminals and may also be referred to as an AP, a Node B, or some other terminology.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support TDD and FDD. In a TDD system, the forward and reverse link transmissions are on the same frequency region so that the reciprocity principle allows the estimation of the forward link channel from the reverse link channel. This enables the AP to extract transmit beam-forming gain on the forward link when multiple antennas are available at the AP.

Figure 27:
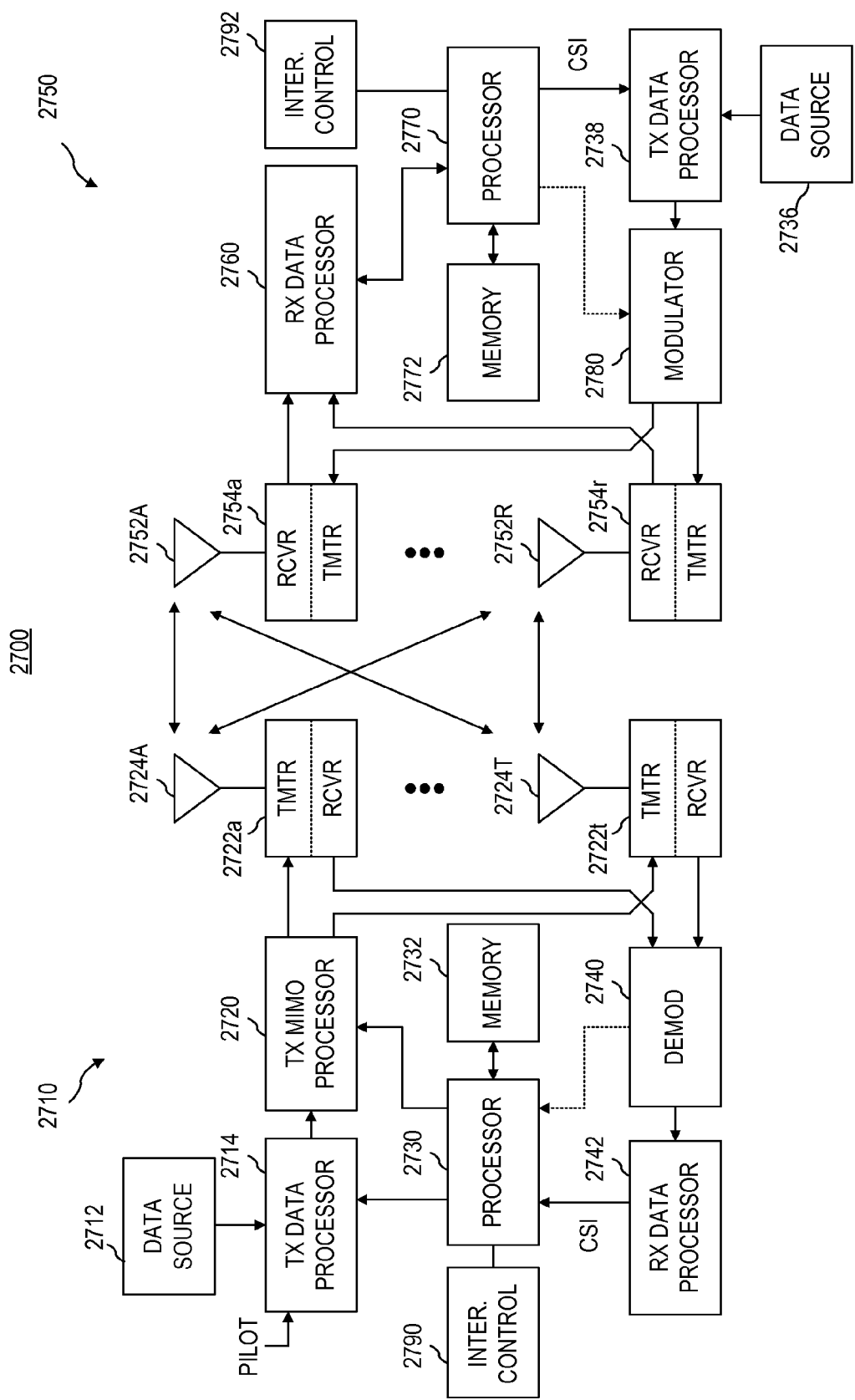
FIG. 27 illustrates a schematic diagram of two nodes for multiple input multiple output wireless communication.

The teachings herein may be incorporated into a node (e.g., a device) employing various components for communicating with at least one other node. FIG. 27 depicts several sample components that may be employed to facilitate communication between nodes. Specifically, FIG. 27 illustrates a wireless device 2710 (e.g., an AP) and a wireless device 2750 (e.g., a UE or AT) of a MIMO system 2700. At the device 2710, traffic data for a number of data streams is provided from a data source 2712 to a transmit ("TX") data processor 2714.

In some aspects, each data stream is transmitted over a respective transmit antenna. The TX data processor 2714 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 2730. A data memory 2732 may store program code, data, and other information used by the processor 2730 or other components of the device 2710.

The modulation symbols for all data streams are then provided to a TX MIMO processor 2720, which may further process the modulation symbols (e.g., for OFDM). The TX MIMO processor 2720 then provides $N_T$ modulation symbol streams to $N_T$ transceivers ("XCVR") 2722a through 2722t that each has a transmitter (TMTR) and receiver (RCVR). In some aspects, the TX MIMO processor 2720 applies beam-forming weights to the symbols of the data streams and to the antenna from which the symbol is being transmitted.

Each transceiver 2722a-2722t receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 2722a through 2722t are then transmitted from $N_T$ antennas 2724a through 2724t, respectively.

At the device 2750, the transmitted modulated signals are received by $N_R$ antennas 2752a through 2752r and the received signal from each antenna 2752a-2752r is provided to a respective transceiver ("XCVR") 2754a through 2754r. Each transceiver 2754a-2754r conditions (e.g., filters, amplifies, and downconverts) a respective received signal, digitizes the conditioned signal to provide samples, and further processes the samples to provide a corresponding "received" symbol stream.

A receive ("RX") data processor 2760 then receives and processes the $N_R$ received symbol streams from $N_R$ transceivers 2754a-2754r based on a particular receiver processing technique to provide $N_T$ "detected" symbol streams. The RX data processor 2760 then demodulates, deinterleaves, and decodes each detected symbol stream to recover the traffic data for the data stream. The processing by the RX data processor 2760 is complementary to that performed by the TX MIMO processor 2720 and the TX data processor 2714 at the device 2710.

A processor 2770 periodically determines which pre-coding matrix to use. The processor 2770 formulates a reverse link message comprising a matrix index portion and a rank value portion. A data memory 2772 may store program code, data, and other information used by the processor 2770 or other components of the device 2750.

The reverse link message may comprise various types of information regarding the communication link and/or the received data stream. The reverse link message is then processed by a TX data processor 2738, which also receives traffic data for a number of data streams from a data source 2736, modulated by a modulator 2780, conditioned by the transceivers 2754a through 2754r, and transmitted back to the device 2710.

At the device 2710, the modulated signals from the device 2750 are received by the antennas 2724a-2724t, conditioned by the transceivers 2722a-2722t, demodulated by a demodulator ("DEMOD") 2740, and processed by a RX data processor 2742 to extract the reverse link message transmitted by the device 2750. The processor 2730 then determines which pre-coding matrix to use for determining the beam-forming weights then processes the extracted message.

FIG. 27 also illustrates that the communication components may include one or more components that perform interference control operations. For example, an interference ("INTER.") control component 2790 may cooperate with the processor 2730 and/or other components of the device 2710 to send/receive signals to/from another device (e.g., device 2750). Similarly, an interference control component 2792 may cooperate with the processor 2770 and/or other components of the device 2750 to send/receive signals to/from another device (e.g., device 2710). It should be appreciated that for each device 2710 and 2750 the functionality of two or more of the described components may be provided by a single component. For example, a single processing component may provide the functionality of the interference control component 2790 and the processor 2730 and a single processing component may provide the functionality of the interference control component 2792 and the processor 2770.

Figure 28:
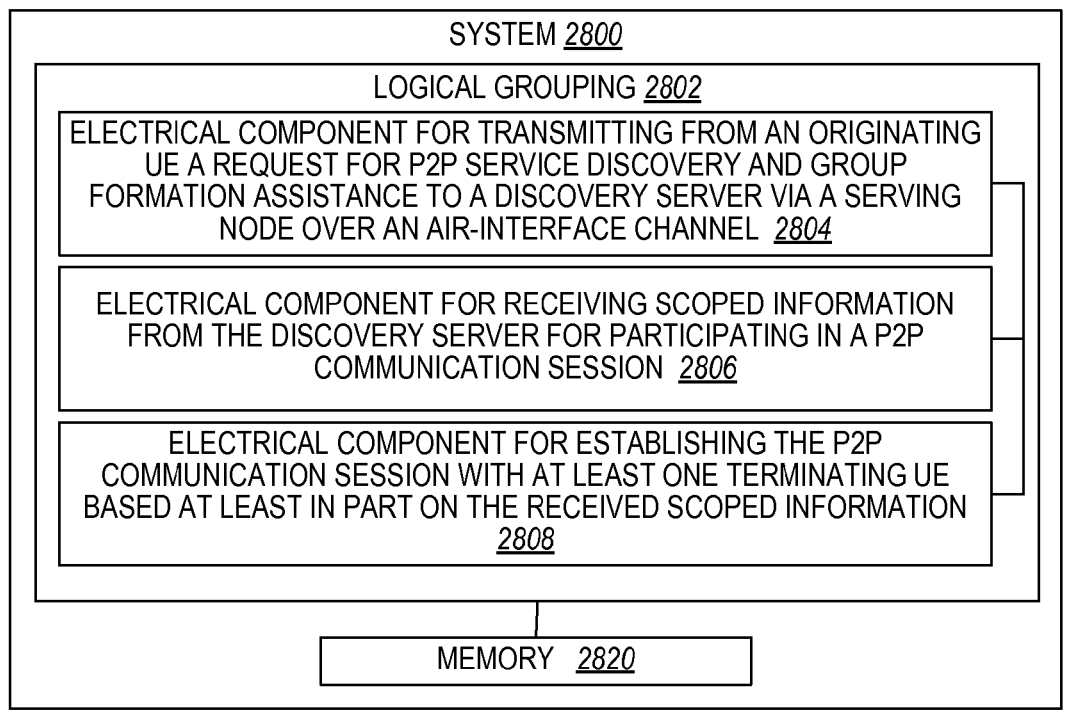
FIG. 28 illustrates a schematic diagram of a system of logical groupings of electrical components such as at user equipment for peer-to-peer networking facilitated by a wireless wide area network.

With reference to FIG. 28, there is illustrated is a system 2800 for P2P networking facilitated by a WWAN. For example, the system 2800 can reside at least partially at a UE. It is to be appreciated that the system 2800 is represented as including functional blocks, which can be functional blocks that represent functions implemented by a computing platform, processor, software, or combination thereof (e.g., firmware). The system 2800 may include a logical grouping 2802 of electrical components that can act in conjunction.

For instance, the logical grouping 2802 can include an electrical component for transmitting from an originating UE a request for P2P service discovery and group formation assistance to a discovery server via a serving node over an air-interface channel (block 2804). The logical grouping 2802 can include an electrical component for receiving scoped information from the discovery server for participating in a P2P communication session (block 2806). The logical grouping 2802 can include an electrical component for establishing the P2P communication session with at least one terminating UE based at least in part on the received scoped information (block 2808). Additionally, the system 2800 can include a memory 2820 that retains instructions for executing functions associated with the electrical components 2804-2808. While shown as being external to the memory 2820, it is to be understood that one or more of the electrical components 2804-2808 can exist within the memory 2820.

Figure 29:
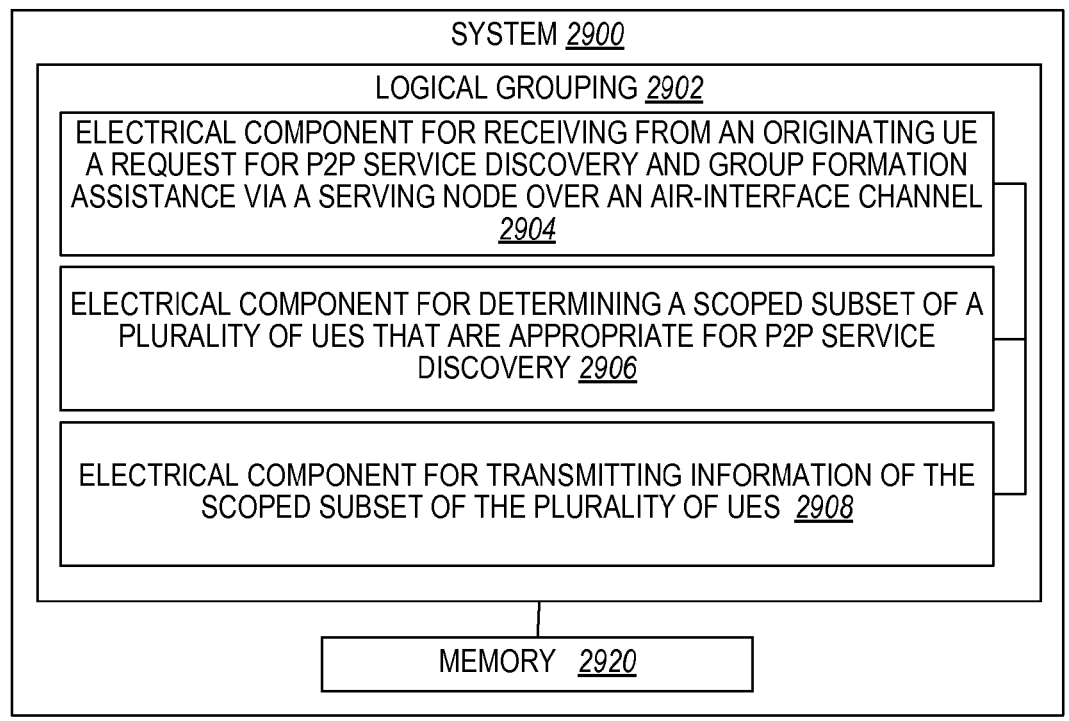
FIG. 29 illustrates a schematic diagram of a system of logical groupings of electrical components such as at a network server for peer-to-peer networking facilitated by a wireless wide area network.

With reference to FIG. 29, illustrated is a system 2900 for P2P networking facilitated by a WWAN. For example, system 2900 can reside at least partially within a network entity (e.g., an eNB). It is to be appreciated that the system 2900 may be represented as including functional blocks, which can be functional blocks that represent functions implemented by a computing platform, processor, software, or combination thereof (e.g., firmware). The system 2900 may include a logical grouping 2902 of electrical components that can act in conjunction.

For example, the logical grouping 2902 can include an electrical component for receiving from an originating UE a request for P2P service discovery and group formation assistance via a serving node over an air-interface channel (block 2904). The logical grouping 2902 can include an electrical component for determining a scoped subset of a plurality of UEs that are appropriate for P2P service discovery (block 2906). Moreover, the logical grouping 2902 can include an electrical component for transmitting information of the scoped subset of the plurality of UEs (block 2908). Additionally, the system 2900 can include a memory 2920 that retains instructions for executing functions associated with the electrical components 2904-2908. While shown as being external to the memory 2920, it is to be understood that one or more of the electrical components 2904-2908 can exist within the memory 2920.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or non-transitory wireless technologies, then the coaxial cable, fiber optic cable, twisted pair, DSL, or the non-transitory wireless technologies are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for peer-to-peer (P2P) networking operable by an originating user equipment (UE), facilitated by a wireless wide area network, comprising:
    transmitting a request for P2P service discovery and group formation assistance to a discovery server via a serving node over an air-interface channel;
    receiving scoped information from the discovery server for participating in a P2P direct communication session, wherein the scoped information identifies a subset of a plurality of UEs that are appropriate for service discovery;
    selecting a packet delivery network gateway based on information received from the discovery server during the P2P service discovery;
    establishing a new Evolved Packet System (EPS) bearer or using an existing EPS bearer to communicate with a terminating UE based on whether the originating UE and the terminating UE are serviced by a same eNodeB; and
    establishing, via the selected packet delivery network gateway, the P2P direct communication session with the terminating UE based at least in part on the received scoped information.

2. The method of claim 1, wherein transmitting the request for P2P service discovery and group formation assistance further comprises communicating with the discovery server that scopes discovery by selecting the subset of the plurality of UEs determined to be proximate to the originating UE.

3. The method of claim 2, wherein the selection of the subset is based on at least one of location, network topologies, user roles and context information.

4. The method of claim 1, wherein the selected packet delivery network gateway is co-located with the serving node.

5. The method of claim 1, wherein the selected packet delivery network gateway is located in a packet core remote to the serving node.

6. The method of claim 5, further comprising selecting a home agent that communicates via an Internet and the packet core to establish communications with the terminating UE.

7. The method of claim 1, wherein establishing the P2P direct communication session further comprises receiving group formation instructions from the discovery server.

8. The method of claim 7, wherein receiving the group formation instructions further comprises receiving instructions for at least one of an automatic trigger for radio frequency proximity discovery, resource coordination among neighboring P2P groups, P2P group establishment criteria, addition of a member to an existing P2P group, and deletion of a member from an existing P2P group.

9. The method of claim 1, further comprising maintaining P2P communication session continuity by reverting to EPS bearer signaling via a packet core.

10. The method of claim 1, wherein transmitting to and receiving from the serving node is in accordance with evolved Universal Mobile Telecommunications System Terrestrial Radio Access (E-UTRA) protocols.

11. An originating user equipment (UE) for peer-to-peer (P2P) networking, comprising:
    at least one processor configured to:
        transmit a request for P2P service discovery and group formation assistance to a discovery server via a serving node over an air-interface channel;
        receive scoped information from the discovery server for participating in a P2P direct communication session;
        select a packet delivery network gateway based on information received from the discovery server during the P2P service discovery;
        establish a new Evolved Packet System (EPS) bearer or using an existing EPS bearer to communicate with a terminating UE based on whether the originating UE and the terminating UE are serviced by a same eNodeB; and
        establish, via the selected packet delivery network gateway, the P2P direct communication session with the terminating UE based at least in part on the received scoped information; and
    a memory coupled to the at least one processor for storing data;
    wherein the scoped information identifies a subset of a plurality of UEs that are appropriate for service discovery.

12. The originating UE of claim 11, wherein the at least one processor transmits the request for P2P service discovery and group formation assistance by communicating with the discovery server that scopes discovery by selecting the subset of the plurality of UEs determined to be proximate to the originating UE.

13. The originating UE of claim 12, wherein the selection of the subset is based on at least one of location, network topologies, user roles and context information.

14. The originating UE of claim 11, wherein the selected packet delivery network gateway is co-located with the serving node.

15. The originating UE of claim 11, wherein the selected packet delivery network gateway is located in a packet core remote to the serving node.

16. The originating UE of claim 15, wherein the at least one processor is further configured to select a home agent that communicates via an Internet and the packet core to establish communications with the terminating UE.

17. The originating UE of claim 11, wherein the at least one processor establishes the P2P direct communication session by receiving group formation instructions from the discovery server.

18. The originating UE of claim 17, wherein the at least one processor receives the group formation instructions by receiving instructions for at least one of an automatic trigger for radio frequency proximity discovery, resource coordination among neighboring P2P groups, P2P group establishment criteria, addition of a member to an existing P2P group, and deletion of a member from an existing P2P group.

19. The originating UE of claim 11, wherein the at least one processor is further configured to maintain P2P communication session continuity by reverting to EPS bearer signaling via a packet core.

20. The originating UE of claim 11, wherein transmitting to and receiving from the serving node is in accordance with evolved Universal Mobile Telecommunications System Terrestrial Radio Access (E-UTRA) protocols.

21. The originating UE of claim 11, wherein the apparatus comprises an originating UE.

22. An originating user equipment (UE) for peer-to-peer (P2P) networking, comprising:
 means for transmitting a request for P2P service discovery and group formation assistance to a discovery server via a serving node over an air-interface channel;
 means for receiving scoped information from the discovery server for participating in a P2P direct communication session, wherein the scoped information identifies a subset of a plurality of user equipments that are appropriate for service discovery;
 means for selecting a packet delivery network gateway based on information received from the discovery server during the P2P service discovery;
 means for establishing a new Evolved Packet System (EPS) bearer or using an existing EPS bearer to communicate with a terminating UE based on whether the originating UE and the terminating UE are serviced by a same eNodeB; and
 means for establishing, via the selected packet delivery network gateway, the P2P direct communication session with the terminating UE based at least in part on the received scoped information.

23. The originating UE of claim 22, further comprising means for communicating with the discovery server that scopes discovery by selecting the subset of the plurality of UEs determined to be proximate to the originating UE.

24. The originating UE of claim 23, wherein the selection of the subset is based on at least one of location, network topologies, user roles and context information.

25. The originating UE of claim 22, wherein the selected packet delivery network gateway is co-located with the serving node.

26. The originating UE of claim 22, wherein the selected packet delivery network gateway is located in a packet core remote to the serving node.

27. The originating UE of claim 26, further comprising means for selecting a home agent that communicates via an Internet and the packet core to establish communications with the terminating UE.

28. The originating UE of claim 22, further comprising means for receiving group formation instructions from the discovery server.

29. The originating UE of claim 28, further comprising means for receiving instructions for at least one of an automatic trigger for radio frequency proximity discovery, resource coordination among neighboring P2P groups, P2P group establishment criteria, addition of a member to an existing P2P group, and deletion of a member from an existing P2P group.

30. The originating UE of claim 22, further comprising means for maintaining P2P communication session continuity by reverting to EPS bearer signaling via a packet core.

31. The originating UE of claim 22, wherein transmitting to and receiving from the serving node is in accordance with evolved Universal Mobile Telecommunications System Terrestrial Radio Access (E-UTRA) protocols.

32. A computer program product, comprising:
 a non-transitory computer-readable medium comprising code for causing an originating user equipment (UE) to:
  transmit a request for peer-to-peer (P2P) service discovery and group formation assistance to a discovery server via a serving node over an air-interface channel;
  receive scoped information from the discovery server for participating in a P2P direct communication session, wherein the scoped information identifies a subset of a plurality of user equipments that are appropriate for service discovery;
  select a packet delivery network gateway based on information received from the discovery server during the P2P service discovery;
  establish a new Evolved Packet System (EPS) bearer or using an existing EPS bearer to communicate with a terminating UE based on whether the originating UE and the terminating UE are serviced by a same eNodeB; and
  establish, via the selected packet delivery network gateway, the P2P direct communication session with the terminating UE based at least in part on the received scoped information.

33. The computer program product of claim 32, wherein the non-transitory computer-readable medium further comprises code for causing the originating UE to communicate with the discovery server that scopes discovery by selecting the subset of the plurality of UEs determined to be proximate to the originating UE.

34. The computer program product of claim 33, wherein the selection of the subset is based on at least one of location, network topologies, user roles and context information.

35. The computer program product of claim 32, wherein the selected packet delivery network gateway is co-located with the serving node.

36. The computer program product of claim 32, wherein the selected packet delivery network gateway is located in a packet core remote to the serving node.

37. The computer program product of claim 36, wherein the non-transitory computer-readable medium further comprises code for causing the originating UE to select a home agent that communicates via an Internet and the packet core to establish communications with the terminating UE.

38. The computer program product of claim 32, wherein the non-transitory computer-readable medium further comprises code for causing the originating UE to receive group formation instructions from the discovery server.

39. The computer program product of claim 38, wherein the non-transitory computer-readable medium further comprises code for causing the originating UE to receive instructions for at least one of an automatic trigger for radio frequency proximity discovery, resource coordination among neighboring P2P groups, P2P group establishment criteria, addition of a member to an existing P2P group, and deletion of a member from an existing P2P group.

40. The computer program product of claim 32, wherein the non-transitory computer-readable medium further comprises code for causing the originating UE to maintain P2P communication session continuity by reverting to EPS bearer signaling via a packet core.

41. The computer program product of claim 32, wherein transmitting to and receiving from the serving node is in accordance with evolved Universal Mobile Telecommunications System Terrestrial Radio Access (E-UTRA) protocols.

42. A method for peer-to-peer (P2P) networking operable by a network entity, facilitated by a wireless wide area network, comprising:
receiving from an originating user equipment (UE) a request for P2P service discovery and group formation assistance via a serving node over an air-interface channel;
determining a scoped subset of a plurality of UEs that are appropriate for P2P service discovery;
transmitting information of the scoped subset of the plurality of UEs for participating in radio frequency (RF) proximity discovery;
transmitting group formation instructions for establishing and maintaining a P2P communication session, wherein the group formation instructions indicate whether the originating UE is to transmit or listen for a proximity detection signal; and
facilitating evolved packet system (EPS) bearer signaling between the originating UE and a terminating UE based on whether the originating UE and the terminating UE are serviced by a same eNodeB.

43. The method of claim 42, further comprising facilitating EPS bearer signaling via a packet core for establishing the P2P communication session within the scoped subset of the plurality of UEs that responded to respective information as part of the scoped service discovery.

44. The method of claim 42, wherein determining the scoped subset is based on at least one of location, network topologies, user roles and context information.

45. The method of claim 42, wherein the facilitating comprises facilitating EPS bearer signaling between the originating UE and the terminating UE, which is connected to the serving node, via a packet data network gate co-located with the serving node.

46. The method of claim 42, wherein the facilitating comprises facilitating EPS bearer signaling between the originating UE and the terminating UE, which is connected to another node, via a packet data network gateway located in a packet core remote to the serving node.

47. The method of claim 46, further comprising facilitating selection of a home agent that communicates via an Internet and the packet core to establish communications with the terminating UE.

48. The method of claim 42, wherein transmitting the group formation instructions further comprises transmitting instructions for at least one of an automatic trigger for the RF proximity discovery, resource coordination among neighboring P2P groups, addition of a member to an existing P2P group, and deletion of a member from an existing P2P group.

49. The method of claim 42, wherein transmitting from and receiving at the serving node is in accordance with evolved Universal Mobile Telecommunications System Terrestrial Radio Access (E-UTRA) protocols.

50. An apparatus for peer-to-peer (P2P) networking, comprising:
at least one processor configured to:
receive from an originating user equipment (UE) a request for P2P service discovery and group formation assistance via a serving node over an air-interface channel;
determine a scoped subset of a plurality of UEs that are appropriate for P2P service discovery;
transmit information of the scoped subset of the plurality of UEs; and
transmit group formation instructions for establishing and maintaining a P2P communication session, wherein the group formation instructions indicate whether the originating UE is to transmit or listen for a proximity detection signal; and
facilitate evolved packet system (EPS) bearer signaling between the originating UE and a terminating UE based on whether the originating UE and the terminating UE are serviced by a same eNodeB; and
a memory coupled to the at least one processor for storing data.

51. The apparatus of claim 50, wherein the at least one processor is further configured to facilitate EPS bearer signaling via a packet core for establishing the P2P communication session within the scoped subset of the plurality of UEs that responded to respective information as part of the scoped service discovery.

52. The apparatus of claim 50, wherein determining the scoped subset is based on at least one of location, network topologies, user roles and context information.

53. The apparatus of claim 50, wherein the facilitating comprises facilitating EPS bearer signaling between the originating UE and the terminating UE, which is connected to the serving node, via a packet data network gate co-located with the serving node.

54. The apparatus of claim 50, wherein the facilitating comprises facilitating EPS bearer signaling between the originating UE and the terminating UE, which is connected to another node, via a packet data network gateway located in a packet core remote to the serving node.

55. The apparatus of claim 54, wherein the at least one processor is further configured to facilitate selection of a home agent that communicates via an Internet and the packet core to establish communications with the terminating UE.

56. The apparatus of claim 50, wherein the at least one processor is further configured to transmit group formation instructions for establishing and maintaining the P2P communication session.

57. The apparatus of claim 50, wherein the at least one processor is further configured to transmit the group formation instructions by transmitting instructions for at least one of an automatic trigger for radio frequency (RF) proximity discovery, resource coordination among neighboring P2P groups, addition of a member to an existing P2P group, and deletion of a member from an existing P2P group.

58. The apparatus of claim 50, wherein transmitting from and receiving at the serving node is in accordance with evolved Universal Mobile Telecommunications System Terrestrial Radio Access (E-UTRA) protocols.

59. The apparatus of claim 50, wherein the apparatus comprises an evolved NodeB (eNB).

60. An apparatus for peer-to-peer (P2P) networking, comprising:
means for receiving from an originating user equipment (UE) a request for P2P service discovery and group formation assistance via a serving node over an air-interface channel;
means for determining a scoped subset of a plurality of UEs that are appropriate for P2P service discovery;

means for transmitting information of the scoped subset of the plurality of UEs;
means for transmitting group formation instructions for establishing and maintaining a P2P communication session, wherein the group formation instructions indicate whether the originating UE is to transmit or listen for a proximity detection signal; and
means for facilitating evolved packet system (EPS) bearer signaling between the originating UE and a terminating UE based on whether the originating UE and the terminating UE are serviced by a same eNodeB.

61. The apparatus of claim 60, further comprising means for facilitating EPS bearer signaling via a packet core for establishing the P2P communication session within the scoped subset of the plurality of UEs that responded to respective information as part of the scoped service discovery.

62. The apparatus of claim 60, wherein determining the scoped subset is based on at least one of location, network topologies, user roles and context information.

63. The apparatus of claim 60, wherein the means for facilitating comprise means for facilitating EPS bearer signaling between the originating UE and the terminating UE, which is connected to the serving node, via a packet data network gate co-located with the serving node.

64. The apparatus of claim 60, wherein the means for facilitating comprise means for facilitating EPS means for facilitating bearer signaling between the originating UE and the terminating UE, which is connected to another node, via a packet data network gateway located in a packet core remote to the serving node.

65. The apparatus of claim 64, further comprising means for facilitating selection of a home agent that communicates via an Internet and the packet core to establish communications with the terminating UE.

66. The apparatus of claim 60, further comprising means for transmitting group formation instructions for establishing and maintaining a P2P communication session.

67. The apparatus of claim 60, further comprising means for transmitting the group formation instructions by transmitting instructions for at least one of an automatic trigger for radio frequency (RF) proximity discovery, resource coordination among neighboring P2P groups, addition of a member to an existing P2P group, and deletion of a member from an existing P2P group.

68. The apparatus of claim 60, wherein transmitting from and receiving at the serving node is in accordance with evolved Universal Mobile Telecommunications System Terrestrial Radio Access (E-UTRA) protocols.

69. A computer program product, comprising:
a non-transitory computer-readable medium comprising code for causing a computer to:
receive from an originating user equipment (UE) a request for peer-to-peer (P2P) service discovery and group formation assistance via a serving node over an air-interface channel;
determine a scoped subset of a plurality of UEs that are appropriate for P2P service discovery;
transmit information of the scoped subset of the plurality of UEs;
transmit group formation instructions for establishing and maintaining a P2P communication session, wherein the group formation instructions indicate whether the originating UE is to transmit or listen for a proximity detection signal; and
facilitate evolved packet system (EPS) bearer signaling between the originating UE and a terminating UE based on whether the originating UE and the terminating UE are serviced by a same eNodeB.

70. The computer program product of claim 69, wherein the non-transitory computer-readable medium further comprises code for causing the computer to facilitate EPS bearer signaling via a packet core for establishing the P2P communication session within the scoped subset of the plurality of UEs that responded to respective information as part of the scoped service discovery.

71. The computer program product of claim 69, wherein determining the scoped subset is based on at least one of location, network topologies, user roles and context information.

72. The computer program product of claim 69, wherein the code for causing the computer to facilitate comprises code for causing the computer to facilitate EPS bearer signaling between the originating UE and the terminating UE, which is connected to the serving node, via a packet data network gate co-located with the serving node.

73. The computer program product of claim 69, wherein the code for causing the computer to facilitate comprises code for causing the computer to facilitate EPS bearer signaling between the originating UE and the terminating UE, which is connected to another node, via a packet data network gateway located in a packet core remote to the serving node.

74. The computer program product of claim 73, wherein the non-transitory computer-readable medium further comprises code for causing the computer to facilitate selection of a home agent that communicates via an Internet and the packet core to establish communications with the terminating UE.

75. The computer program product of claim 69, wherein the non-transitory computer-readable medium further comprises code for causing the computer to transmit group formation instructions for establishing and maintaining the P2P communication session.

76. The computer program product of claim 69, wherein the non-transitory computer-readable medium further comprises code for causing the computer to transmit the group formation instructions by transmitting instructions for at least one of an automatic trigger for radio frequency (RF) proximity discovery, resource coordination among neighboring P2P groups, addition of a member to an existing P2P group, and deletion of a member from an existing P2P group.

77. The computer program product of claim 69, wherein transmitting from and receiving at the serving node is in accordance with evolved Universal Mobile Telecommunications System Terrestrial Radio Access (E-UTRA) protocols.

* * * * *